(12) United States Patent
Hamamoto et al.

(10) Patent No.: US 11,322,903 B2
(45) Date of Patent: May 3, 2022

(54) SOLID STATE LASER APPARATUS

(71) Applicant: MITSUBISHI HEAVY INDUSTRIES, LTD., Tokyo (JP)

(72) Inventors: Koichi Hamamoto, Tokyo (JP); Ryuichi Matsuda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 120 days.

(21) Appl. No.: 16/638,888

(22) PCT Filed: Nov. 2, 2018

(86) PCT No.: PCT/JP2018/040798
§ 371 (c)(1),
(2) Date: Feb. 13, 2020

(87) PCT Pub. No.: WO2019/163207
PCT Pub. Date: Aug. 29, 2019

(65) Prior Publication Data
US 2020/0194956 A1    Jun. 18, 2020

(30) Foreign Application Priority Data
Feb. 26, 2018 (JP) .............................. JP2018-032198

(51) Int. Cl.
*H01S 3/042* (2006.01)
*H01S 3/02* (2006.01)
(Continued)

(52) U.S. Cl.
CPC .............. *H01S 3/042* (2013.01); *H01S 3/025* (2013.01); *H01S 3/0813* (2013.01); *H01S 3/1618* (2013.01); *H01S 3/1643* (2013.01)

(58) Field of Classification Search
CPC ............. H01S 3/04; H01S 3/0401; H01S 3/02
(Continued)

(56) References Cited

U.S. PATENT DOCUMENTS 5,553,088 A * 9/1996 Brauch .................. H01S 3/042
                                                          372/34
5,982,792 A   11/1999 Kasamatsu et al.
(Continued)

FOREIGN PATENT DOCUMENTS

EP    2 475 054        7/2012
JP    10-294520        11/1998
(Continued)

OTHER PUBLICATIONS

International Search Report dated Feb. 5, 2019 in International (PCT) Application No. PCT/JP2018/040798.
(Continued)

*Primary Examiner* — Tuan N Nguyen
(74) *Attorney, Agent, or Firm* — Wenderoth, Lind & Ponack, L.L.P.

(57) ABSTRACT

A solid state laser apparatus includes a plurality of cold heads, a cooling apparatus, laser media and a seed light source. The cooling apparatus is configured to cool the plurality of cold heads. The laser media are arranged in contact with each of the plurality of cold heads, and configured to amplify a first laser beam and reflect the first laser beam. The seed light source is configured to irradiate a first laser medium of the laser media with the first laser beam. The first laser medium is arranged on a first of the cold heads. The laser media are configured to reflect the first laser beam irradiated to the first laser medium to a second laser medium of the laser media. The second laser medium is arranged on a second of the cold heads. The cold heads are configured to cool the laser media.

16 Claims, 13 Drawing Sheets

(51) Int. Cl.
*H01S 3/081* (2006.01)
*H01S 3/16* (2006.01)

(58) Field of Classification Search
USPC .......................................................... 372/34
See application file for complete search history.

(56) References Cited

U.S. PATENT DOCUMENTS

| | | | | |
|---|---|---|---|---|
| 10,862,261 | B2* | 12/2020 | Ueda | H01S 3/0407 |
| 2002/0172253 | A1* | 11/2002 | Vetrovec | H01S 3/042 |
| | | | | 372/95 |
| 2003/0053496 | A1* | 3/2003 | Noda | H01S 5/024 |
| | | | | 372/35 |
| 2007/0297469 | A1* | 12/2007 | Brown | H01S 3/042 |
| | | | | 372/34 |
| 2014/0016658 | A1* | 1/2014 | Galasso | H01S 3/0404 |
| | | | | 372/35 |
| 2017/0279244 | A1 | 9/2017 | Kasahara et al. | |
| 2018/0233874 | A1 | 8/2018 | Hamamoto et al. | |
| 2019/0356105 | A1* | 11/2019 | Ueda | H01S 3/09415 |

FOREIGN PATENT DOCUMENTS

| | | |
|---|---|---|
| JP | 2014-022568 | 2/2014 |
| JP | 2014-239144 | 12/2014 |
| JP | 2016-072346 | 5/2016 |
| JP | 2017-141989 | 8/2017 |
| WO | 2017/149944 | 9/2017 |
| WO | 2018/147231 | 8/2018 |

OTHER PUBLICATIONS

English Translation of the International Preliminary Report on Patentability dated Sep. 3, 2020 in International Application No. PCT/JP2018/040798.
Extended European Search Report dated Nov. 24, 2020 in corresponding European Patent Application No. 18906858.8.

* cited by examiner

SOLID STATE LASER APPARATUS

CROSS-REFERENCE TO RELATED APPLICATION

The present application claims priority based on Japanese Patent Application No. 2018-032198 filed on Feb. 26, 2018 and all disclosure thereof is incorporated herein by reference.

TECHNICAL FIELD

This relates to a solid state laser apparatus.

BACKGROUND ART

By irradiating with laser beam a laser medium irradiated with excitation light, the laser beam is amplified and outputted. It is known that a high power laser beam is obtained by use of this principle. At that time, in the laser medium, energy of the irradiated excitation light is converted to heat heating the laser medium and light released to surroundings. By converting energy to heat, a temperature of the laser medium rises. In addition, amplification efficiency is improved with the laser medium in low temperature. For those reasons, it is necessary to cool the laser medium.

In US 2007/0297469 A1, a technology of contacting a laser medium with a disk having a high thermal conductivity and amplifying laser light transmitted through the laser medium and the disk is disclosed. The heat generated in the laser medium is dissipated to a cooling channel via the disk in contact.

In JP 2016-72346 A, a technology of cooling a laser medium by a cryogenic liquid is disclosed.

In JP 2017-141989 A, a cryogenic refrigerator in which a compressor and an expander are connected by use of a flexible pipe is disclosed.

In JP 2014-239144 A, a heat conducting structure having flexibility, formed by bundling a plurality of wire-shaped metal materials, is disclosed.

SUMMARY OF INVENTION

In order to obtain a high power laser beam, it is necessary to keep a laser medium in a low temperature. A large cooling system is used in a high power solid state laser apparatus to cool a laser medium. For those reasons, a high power solid state laser apparatus becomes large.

In view of the above situation, it is an object of the present invention to provide a high power small sized solid state laser apparatus. Other objectives can be understood from following descriptions and explanations of embodiments.

In order to achieve the above objective, the solid state laser apparatus related to embodiments of the present invention is provided with a plurality of cold heads, a cooling apparatus, laser media and a seed light source. The cooling apparatus cools the plurality of cold heads. The plurality of laser media are arranged in contact with each of the plurality of cold heads, amplifies an irradiated first laser beam and reflects the first laser beam. The seed light source irradiates a first laser medium of the plurality of laser media with the first laser beam. In addition, the plurality of laser media reflects the first laser beam from one of the plurality of laser media arranged to one of the plurality of cold heads to another one of the plurality of laser media arranged to another one of the plurality of cold heads. In addition, the plurality of cold heads cools the plurality of laser media.

The above described solid state laser apparatus may be further provided with a reflection surface arranged on a boundary between each of the plurality of laser media and the plurality of cold heads, which reflects the first laser beam.

A thickness of the above described plurality of laser media may be less than or equal to 1 mm.

The above described solid state laser apparatus may be further provided with a vacuum vessel including the plurality of cold heads therein.

The above described solid state laser apparatus may be further provided with a temperature measuring device that measures temperature of the plurality of laser media.

The above described temperature measuring device may be provided with an optical analyzer, a determination section and an output device. In this case, the optical analyzer analyzes spectrum of light released from each of the plurality of laser media. The determination section determines temperature of each laser medium based on the spectrum.

The above described solid state laser apparatus may be further provided with a light irradiation section which is supported by a cold head and which irradiates each of the plurality of laser media with excitation light.

The above described solid state laser apparatus may be further provided with a light irradiation section which irradiates each of the plurality of laser media with excitation light. In this case, the light irradiation section may be provided with an optical sensor, an angle control section and an irradiation section. The optical sensor detects light wave from each laser medium. The angle control section determines irradiation direction of excitation light based on detection result. The irradiation section irradiates a surface of each laser medium to which a first laser beam is irradiated, with the excitation light, based on the irradiation direction.

The above described angle control section may calculate a position where the first laser beam is incident to each laser medium. The irradiation direction may be determined so that the excitation light is irradiated at the position of the laser medium where the first laser beam is irradiated.

The above described light irradiation section may be provided with a filter that passes light of a wavelength of the first laser beam in front of the optical sensor.

The above described solid state laser apparatus may be further provided with a light irradiation section that irradiates each of the plurality of laser media with excitation light. In this case, the light irradiation section may be provided with an angle control section and an irradiation section. The angle control section determines an irradiation direction of the excitation light based on light irradiation state. The irradiation section irradiates a surface of the each laser medium where the first laser beam is irradiated, with the excitation light, based on the irradiation direction.

The above described angle control section may hold change information that shows a position of the laser medium where the first laser beam in correspondence with the light irradiation state is irradiated. In addition, the above described angle control section may determine an irradiation direction of the excitation light based on the position of the laser medium where the first laser beam in correspondence with a current light irradiation state is irradiated, from the change information.

The above described light irradiation section may be provided outside the vacuum vessel. In addition, the vacuum vessel may be provided with an excitation light window that transmits the excitation light.

The above described plurality of cold heads may include at least three cold heads.

The above described plurality of cold heads may include a first set of cold heads including two or more cold heads and a second set of cold heads including two or more cold heads. In this case, the plurality of laser media includes a first laser media group including a laser medium arranged to the first set of cold heads and a second laser media group including a laser medium arranged to the second set of cold heads. The first laser media group includes the first laser medium. The seed light source irradiates a second laser medium included in the second laser media group with a second laser beam. One laser medium included in the first laser media group and arranged to one cold head of the first set of cold heads reflects the first laser beam incident to the first laser medium to another one laser medium included in the first laser media group and arranged to another one cold head of the first set of cold heads different from the one cold head. One laser medium included in the second laser media group and arranged to one cold head of the second set of cold heads reflects the second laser beam incident to the second laser medium to another one laser medium included in the second laser media group and arranged to another one cold head of the second set of cold heads different from the one cold head.

The above described solid state laser apparatus may be further provided with a light combiner that combines the first laser beam reflected by the first laser media group and the second laser beam reflected by the second laser media group.

According to the present invention, the solid state laser apparatus can obtain a high power and realize downsizing.

DESCRIPTION OF EMBODIMENTS

Embodiment 1

Figure 1:
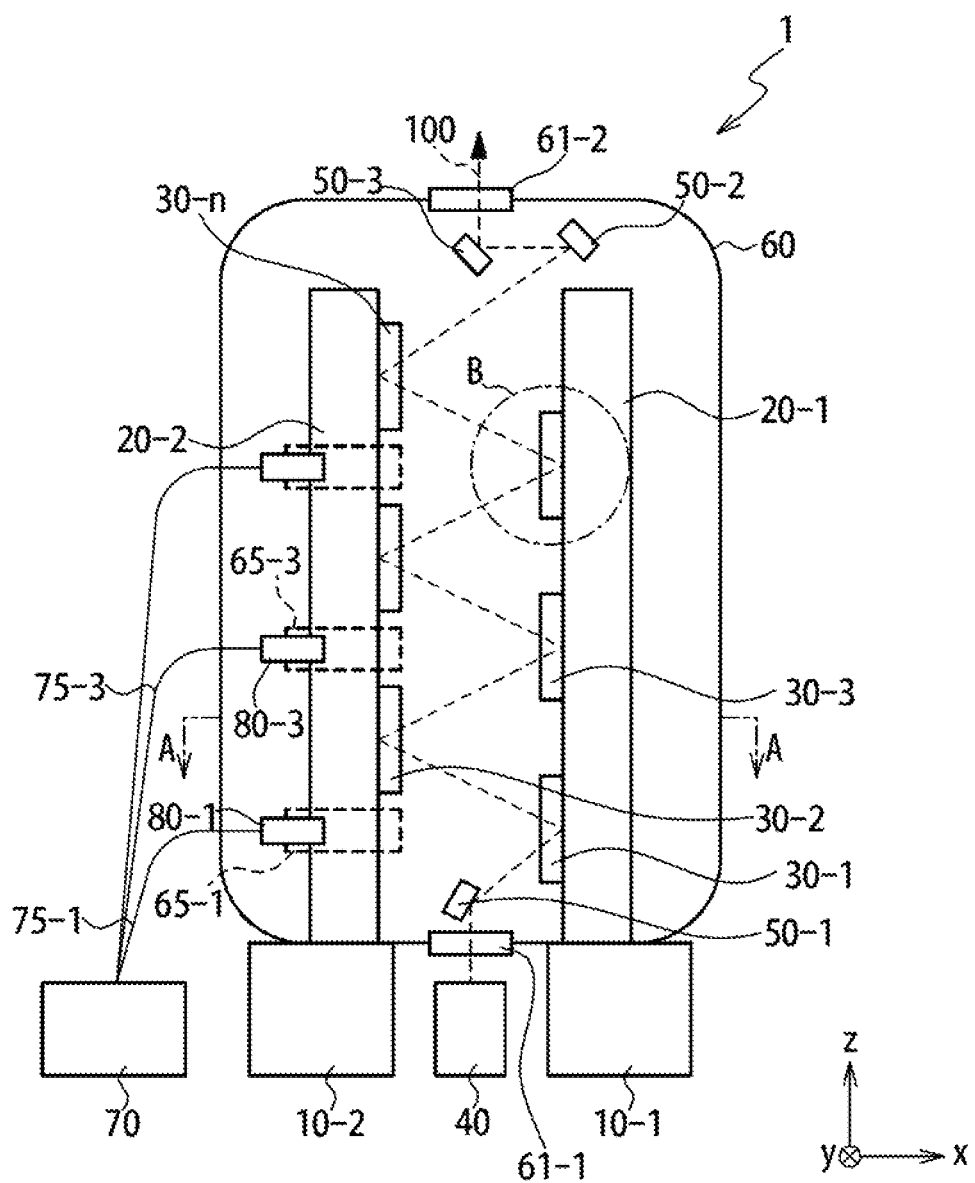
FIG. 1 is a schematic diagram of a solid state laser apparatus related to embodiment 1.

A solid state laser apparatus 1 related to the embodiment 1 is provided with a seed light source 40, a plurality of laser media 30 (a first laser medium 30-1, a second laser medium 30-2, ..., a n-th laser medium 30-n) and a plurality of mirror 50 (a first mirror 50-1, a second mirror 50-2, a third mirror 50-3), as shown in FIG. 1. The seed light source 40 irradiates the first mirror 50-1 with a laser beam via a first laser window 61-1. The irradiated laser beam travels along a laser beam path 100. In particular, the laser beam is sequentially reflected by the first mirror 50-1, the first laser medium 30-1, the second laser medium 30-2, ..., the n-th laser medium 30-n, the second mirror 50-2, the third mirror 50-3 and is outputted through a second laser window 61-2. For this reason, the laser beam irradiated by the seed light source 40 is amplifies by the laser media 30 and obtains a high power. In addition, the plurality of mirrors 50 is adjusted so that the laser beam irradiated from the seed light source 40 travels along the laser beam path 100.

In addition, the solid state laser apparatus 1 is provided with two cooling apparatuses 10 (a first cooling apparatus 10-1, a second cooling apparatus 10-2) and two cold heads 20 (a first cold head 20-1, a second cold head 20-2) in order to cool the laser media 30. The cooling apparatuses 10 cool the cold heads 20. The cooled cold heads 20 are in close contact to the plurality of laser media 30. For this reason, heat generated at the laser media 30 is transmitted to the cold heads 20. In other words, the cold heads 20 cool the laser media 30. In addition, a thickness of the laser media 30 is thin and heat generated at the laser media 30 is efficiently cooled by the cold heads 20. In this way, since the cooling is performed by sticking the thin laser media 30 to the cold heads 20, the cooling system of the laser media 30 can be configured smaller than in conventional technologies. That is, the solid state laser apparatus 1 can be configured smaller than in conventional technologies.

Figure 2:
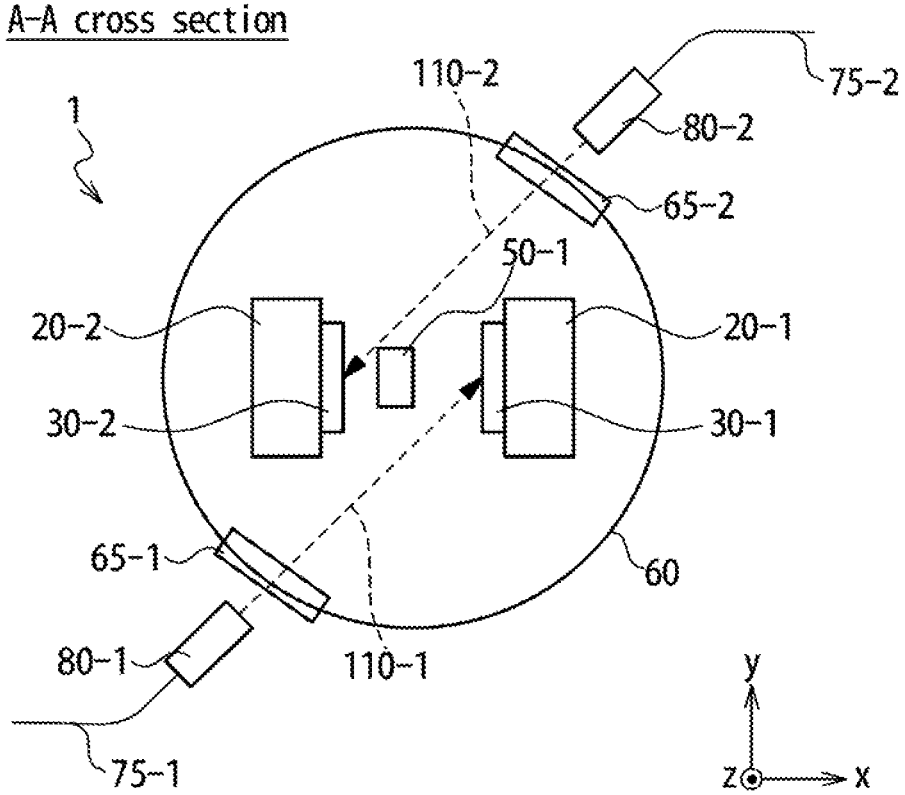
FIG. 2 is an A-A cross section diagram of FIG. 1.

The laser media 30 amplify irradiated laser beam by being irradiated with excitation light. For this reason, the solid state laser apparatus 1 is provided with an excitation light source 70, a plurality of optical fibers 75 (a first optical fiber 75-1, a second optical fiber 75-2, a third optical fiber 75-3, ...) and a plurality of light irradiation sections 80 (a first light irradiation section 80-1, a second light irradiation section 80-2, a third light irradiation section 80-3, ...), in order to irradiate the laser media 30 with excitation light. The excitation light source 70 is connected to the plurality of optical fibers 75 and irradiates the optical fibers 75 with excitation light. The optical fibers 75 have optical paths therein and guide the excitation light. The optical fibers 75 are connected to the light irradiation sections 80, as shown in FIG. 2. The excitation light, which has traveled along the optical fibers 75, is irradiated from the light irradiation sections 80 to the laser media 30.

In addition, the solid state laser apparatus 1 is provided with a vacuum vessel 60. The cold heads 20 and the laser media 30 are provided inside the vacuum vessel 60. The inside of the vacuum vessel 60 is kept in a vacuum, for example in a high vacuum (greater than or equal to $10^{-5}$ Pa, lesser than 0.1 Pa). As a result, heat from the outside of the vacuum vessel 60 to the cold head 20 is cut off. In addition, water drops, frost or the like are suppressed from sticking to the cold heads 20 and the laser media 30. In order to increase insulation effect, the inside of the vacuum vessel 60 may be a molecular flow region. The vacuum vessel 60 is provided with laser windows 61 (a first laser window 61-1, a second laser window 61-2) that transmit laser beam and excitation light windows 65 (a first excitation light window 65-1, a second excitation light window 65-2, a third excitation light window 65-3) that transmit excitation light, as shown in FIG. 1. For this reason, the laser beams can pass through laser windows 61 from outside the vacuum vessel 60 to inside and from inside to outside. In addition, the excitation light also can pass through the excitation light windows 65 from outside of the vacuum vessel 60 to inside.

A configuration of a solid state laser apparatus 1 will be described. The solid state laser apparatus 1 is provided with cooling apparatuses 10, cold heads 20, laser media 30, a seed light source 40, mirrors 50, a vacuum vessel 60, an excitation light source 70, optical fibers 75 and light irradiation sections 80. Two cooling apparatuses 10 are provided and are connected to two cold heads 20, respectively. The cooling apparatuses 10 cool connection part with the cold heads 20 by compressing and expanding refrigerant. That is, the first cooling apparatus 10-1 cools the first cold head 20-1 and the second cooling apparatus 10-2 cools the second cold head 20-2. The cooling apparatuses 10 are provided outside the vacuum vessel 60. For this reason, the vacuum vessel 60 is provided with holes for the cooling apparatuses 10 to cool the cold heads 20.

The cold heads 20 are connected to the cooling apparatuses 10. That is, the first cold head 20-1 is connected to the first cooling apparatus 10-1 and the second cold head 20-2 is connected to the second cooling apparatus 10-2. In addition, each cold head 20 is connected to and supported by the vacuum vessel 60. The cold heads 20 are formed in a column shape, in a quadrangular prism shape for example. A longitudinal direction of the first cold head 20-1 and a longitudinal direction of the second cold head 20-2 are arranged to be parallel to each other. A base surface, which is an end surface perpendicular to a longitudinal direction, of a cold head 20 is connected to the cooling apparatus 10. A laser medium 30 is in close contact with a side surface, which is a surface parallel to a longitudinal direction, of a cold head 20. All laser media 30 are in close contact with a same side surface of a cold head 20. Cold heads 20 cool laser media 30 by being cooled by the cooling apparatuses 10. The cold heads 20 are formed of copper or the like, of which thermal conductivity is high for example. Here, to facilitate understanding, the longitudinal direction of the cold heads 20 is set as z axis direction and the direction perpendicular to the side surface of the cold head 20 to which the laser media 30 are in close contact is set as x axis direction. In addition, the direction perpendicular to z axis direction and x axis direction is set as y axis direction. In addition, the direction from a cold head 20 to a cooling apparatus 10 provided thereto is set as −z direction. Furthermore, a direction from the second cold head 20-2 to the first cold head 20-1 is set as +x direction.

The laser media 30 are in close contact with and are supported by the cold heads 20. A side surface of the first cold head 20-1 on which laser media 30 are in close contact and a side surface of the second cold head 20-2 on which laser media 30 are in close contact are provided to face in parallel to each other. That is, the side surface of the first cold head 20-1 on which laser media 30 are in close contact faces a direction to the second cold head 20-2, that is, −x direction. In addition, the side surface of the second cold head 20-2 to which laser media 30 are in close contact faces a direction to the first cold head 20-1, that is, +x direction. In addition, in y axis direction, a position of the first cold head 20-1 is same as a position of the second cold head 20-2.

In addition, laser media 30 are arranged side by side in the longitudinal direction of cold heads 20, that is, z axis direction. In addition, laser media 30 arranged to the first cold head 20-1 and laser media 30 arranged to the second cold head 20-2 are arranged and shifted in z axis direction. In particular, a plurality of laser media 30 (the first laser medium 30-1, the third laser medium 30-3, . . . ) are arranged on the side surface of the first cold head 20-1 in x direction, as shown in FIG. 1. In addition, another plurality of laser media 30 (the second laser medium 30-2, the fourth laser medium 30-4, . . . ) are arranged on the side surface of the second cold head 20-2 in x direction. The first laser medium 30-1 and the second laser medium 30-2 are arranged so that the laser beam reflected by the first laser medium 30-1 is incident on the second laser medium 30-2. In addition, the third laser medium 30-3 is arranged so that the laser beam reflected by the second laser medium 30-2 is incident on the third laser medium 30-3. In addition, the first laser medium 30-1 and the third laser medium 30-3 are provided adjacent to each other. That is, no other laser medium 30 is provided between the first laser medium 30-1 and the third laser medium 30-3. As described above, the plurality of laser media 30 is arranged so as to sequentially reflect the laser beam, respectively. In other words, in z axis direction, the second laser medium 30-2 is arranged between the first laser medium 30-1 and the third laser medium 30-3. For example, in z axis direction, the second laser medium 30-2 is arranged on a middle point between the first laser medium 30-1 and the third laser medium 30-3. That is, in z axis direction, the laser media 30 of the second cold head 20-2 except laser media 30 arranged at ends in +z direction are provided between adjacent laser media 30 of the first cold head 20-1, on their middle point for example. As a result, the laser beam travels along the laser beam path 100 in the longitudinal direction of the cold heads 20, that is, in +z direction. It should be noted that, in z axis direction, the laser media 30 of the first cold head 20-1 includes laser media 30 arranged at an end in +z direction which may be provided between adjacent laser media 30 of the second cold head 20-2, at their middle point for example. In this case, the n-th laser medium 30-*n* which reflects the laser beam at last among the plurality of laser media 30 is arranged on the second cold head 20-2.

Figure 3:
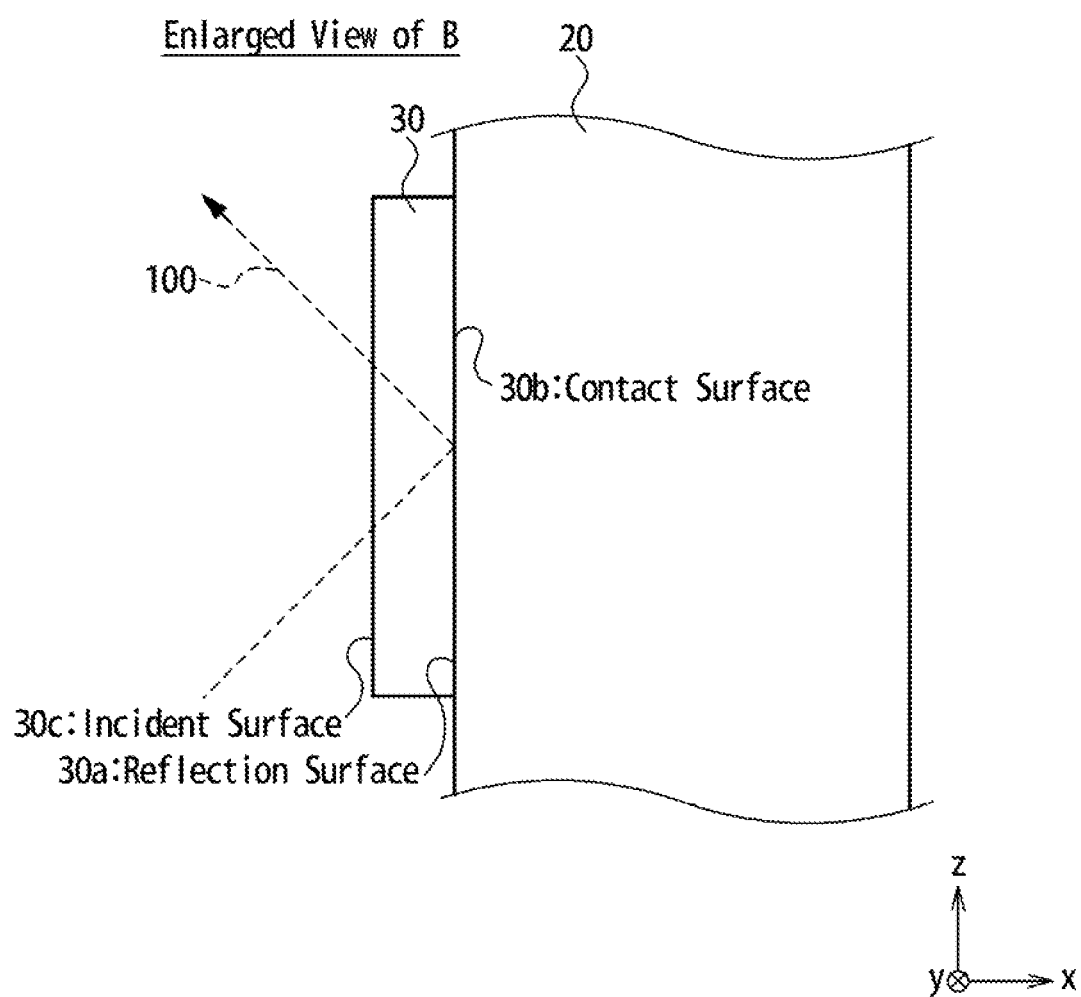
FIG. 3 is an enlarged view of area B of FIG. 1.

A laser medium 30 is provided with, as shown in FIG. 3, a reflection surface 30*a*, a contact surface 30*b* and an incident surface 30*c*. The contact surface 30*b* forms a part of a surface of the laser medium 30 and is in contact with the cold head 20. For this reason, heat generated at the laser medium 30 is transmitted to the cold head 20 via the contact surface 30*b*. The incident surface 30*c* is a surface through which the laser beam is incident on the laser medium 30. The reflection surface 30*a* reflects the laser beam incident to the laser medium 30. The reflection surface 30*a* is a back surface of the contact surface 30*b*. That is, the contact surface 30*b* is a surface in +x direction of a part in contact with the cold head 20 and the reflection surface 30*a* is a surface in x direction of a part in contact with the cold head 20. For this reason, the laser beam incident to the laser medium 30 is incident through the incident surface 30*c*. The incident laser beam travels inside the laser medium 30 and reflects on the reflection surface 30*a* of the surface by which the laser medium 30 is in contact with the cold head 20. The reflected laser beam travels again inside the laser medium 30 and is irradiated from the incident surface 30*c*. In addition, the laser beam is amplified by passing inside the laser medium 30, that is, an excitation part. The laser medium 30 is formed by Yb:YAG (Ytterbium doped Yttrium Aluminum Garnet), Nd:YAG (Neodymium Doped Yttrium Aluminum Garnet), Yb:CAF2 (Ytterbium doped Calcium Fluoride), Yb:LuAG (Ytterbium doped Lutetium Aluminum Garnet) or the like, for example. In addition, the incident surface 30c may be provided with an antireflection coating in order to reduce loss of laser beam. The reflection surface 30a may be provided with a high reflection coating in order to improve reflectance. In addition, the contact surface 30b of the laser medium 30 may be provided with a film that reflects the laser beam.

In addition, the thickness of the laser media 30 may be thin. When the thickness of the laser media 30 is thin, the cold head 20 can sufficiently absorb heat generated inside the laser media 30. By doing so, refractive index of the laser media 30 is suppressed from changing due to head inside laser media 30 from the incident laser beam. As a result, the solid state laser apparatus 1 can output a laser beam with a high power and a high quality. Thickness of laser media 30 is determined based on thermal conductivity of laser media 30 and performance of cooling apparatuses 10 and cold head 20 to cool the laser media 30. For example, the thickness of the laser media 30 is less than 1 mm. In addition, coating, room temperature bonding, adhesion by adhesive, or the like are shown as example for method of contacting the laser media 30 close to the cold heads 20.

The seed light source 40 is provided outside the vacuum vessel 60 in −z direction as shown in FIG. 1. The seed light source 40 irradiates the vacuum vessel 60 with a laser beam. The irradiated laser beam passes through the first laser window 61-1 and is irradiated inside the vacuum vessel 60. A wavelength of the laser beam is selected in accordance with a material of the laser media 30. For example, when the laser media 30 are formed with Yb:YAG, 1030 nm may be selected as the wavelength of the laser beam.

The mirrors 50 are installed inside the vacuum vessel 60 and are supported by the vacuum vessel 60. The first mirror 50-1 is installed so that to reflect the laser beam irradiated from the seed light source 40 to the first laser medium 30-1. As a result, the laser beam irradiated from the seed light source 40 is irradiated to the first laser medium 30-1. In addition, the second mirror 50-2 is installed so as to reflect the laser beam reflected by the n-th laser medium 30-n to the third mirror 50-3. The third mirror 50-3 is installed so that the laser beam reflected by the second mirror 50-2 reflects thereon and passes through the second laser window 61-2 to outside the vacuum vessel 60. That is, the second mirror 50-2 and the third mirror 50-3 are installed in order to reflect the laser beam reflected by the n-th laser medium 30-n to outside the vacuum vessel 60. The mirrors 50 are installed so that the laser beam irradiated from the seed light source 40 is amplified in laser media 30 and travels to outside the vacuum vessel 60.

The excitation light source 70 is installed outside the vacuum vessel 60 and irradiates the optical fibers 75 with excitation light therein. Wavelength of the excitation light is selected in accordance with material of the laser media 30. For example, when the laser media 30 is formed with Yb:YAG, 940 nm may be selected as wavelength of the excitation light.

The optical fiber 75 are connected to the excitation light source 70 by an end. The optical fiber 75 is connected to light irradiation sections 80 by another end. For example, the first optical fiber 75-1 is connected to the excitation light source 70 and the first light irradiating section 80-1. Similarly, the second optical fiber 75-2 is connected to the excitation light source 70 and the second light irradiation section 80-2. In other words, each of the optical fibers 75 is connected to the excitation light source 70 and a light irradiation section 80 different from each other. The optical fibers 75 receive excitation light irradiated from the excitation light source 70 to irradiate light irradiation sections 80 therewith. As a result, the excitation light irradiated from the excitation light source 70 is propagated to each light irradiation section 80.

The light irradiation sections 80 are provided outside the vacuum vessel 60 and are supported by the vacuum vessel 60. In addition, the light irradiation sections 80 are installed so as to irradiate the laser media 30 with the excitation light propagated through the optical fibers 75. In other words, the first light irradiation section 80-1 that irradiates the first laser medium 30-1 with the excitation light is installed in −x direction from the first laser medium 30-1, as shown in FIG. 2. In addition, in z axis direction, the first light irradiation section 80-1 is installed at a same position as the first laser medium 30-1. The second light irradiation section 80-2 that irradiates the second laser medium 30-2 with the excitation light is installed in +x direction from the second laser medium 30-2. In addition, in z axis direction, the second light irradiation section 80-2 is installed in a same position as the second laser medium 30-2. Similarly, other light irradiation sections 80 are installed based on direction of incident surfaces 30c of the laser media 30 to which the excitation light is irradiated with respect to x axis direction and a position of the laser media 30 in z axis direction.

In addition, the light irradiation sections 80 are provided with lenses. The lenses adjust ranges of excitation light irradiations. For this reason, the excitation light irradiated from the light irradiation section 80 passes through excitation windows 65 and is irradiated to incident surfaces 30c of the laser media 30. As a result, the laser media 30 are excited and amplify laser beams passing through inside the laser media 30.

The vacuum vessel 60 is supported by an apparatus outside the solid state laser apparatus 1 or the like. For example, the vacuum vessel 60 is supported by an apparatus provided with the solid state laser apparatus 1, a stand on which the solid state laser apparatus 1 is installed, or the like. In addition, the vacuum vessel 60 includes the cold heads 20 inside and is provided with the laser windows 61 and excitation light windows 65. The laser windows 61 are provided at positions where laser beam paths 100 cross the vacuum vessel 60, in order to make laser beams pass through. In particular, the first laser window 61-1 is provided at a position irradiated by the seed light source 40 with the laser beam in accordance with a direction of the laser beam. That is, the first laser window 61-1 is provided on a surface of the vacuum vessel 60 in −z direction. In addition, the second laser window 61-2 is provided at a position where the solid state laser apparatus 1 outputs the laser beam in accordance with a direction of the laser beam. In other words, the second laser window 61-2 is provided on a surface of the vacuum vessel 60 in +z direction.

The excitation light window 65 is provided at positions where the excitation light path 110 crosses the vacuum vessel 60 in order to make the excitation light passes through. In particular, the first excitation light window 65-1 is provided in a direction the first light irradiation section 80-1 irradiates with excitation light. For this reason, in z axis direction, the first excitation light window 65-1 is installed at a same position as the first light irradiation section 80-1. Similarly, other excitation light windows 65 are installed based on positions of light irradiation sections 80 that irradiate excitation light windows 65 with excitation light.

(Using Method)

A method of using the solid state laser apparatus 1 will be described. At first, the first cooling apparatus 10-1 and the second cooling apparatus 10-2 start operating and cool the first cold head 20-1 and the second cold head 20-2. When temperature of both cold heads 20 is dropped enough, the seed light source 40 starts operating and irradiates with a laser beam. The temperature of the cold heads 20 when starting the seed light source 40 to operate is determined based on materials of the laser media 30. For example, in a case of laser media 30 of Yb:YAG, the seed light source 40 is started to operate when the temperature of the cold heads 20 drops lower than 120K. The laser beam irradiated by the seed light source 40 is reflected by the mirrors 50 and the laser media 30 and is outputted from the solid state laser apparatus 1. Next, the excitation light source 70 is started to operate and irradiates from the light irradiation sections 80 to the laser media 30 with the excitation light. When irradiated with excitation light, the laser media 30 amplify laser beams that are irradiated thereto in accordance with excitation light energy. For this reason, the energy of the laser beam outputted from the solid state laser apparatus 1 becomes higher than energy of the laser beam irradiated from the seed light source 40. Finally, the energy of the laser beam outputted by the seed light source 40 is made higher than before starting the excitation light source 70 to operate. As a result, the energy of the laser beam outputted by the solid state laser apparatus 1 becomes further higher. By using the solid state laser apparatus 1 as described above, the solid state laser apparatus 1 can output laser beam with a high power and a high quality.

Embodiment 2

A temperature of the laser media 30 may be measured and cooling performance of the solid state laser apparatus 1 and the energy of the outputted laser beam may be adjusted based on a result of measuring. For example, when outputting a high energy laser beam, cooling energy of the cooling apparatus 10 is set to maximum. Next, the energy of the excitation light outputted by the excitation light source 70 is set higher. In addition, the energy of the laser beam outputted by the seed light source 40 is set higher. When the laser media 30 exceeds a predetermined temperature, for example when it exceeds 120K, the energy of the laser beam is set lower. As a result, the energy of the outputted laser beam becomes maximal in a range of not exceeding cooling performance of the solid state laser apparatus 1. In this way, efficiency of outputting the laser beam of the solid state laser apparatus 1 can be improved by measuring temperature of the laser media 30.

Figure 4:
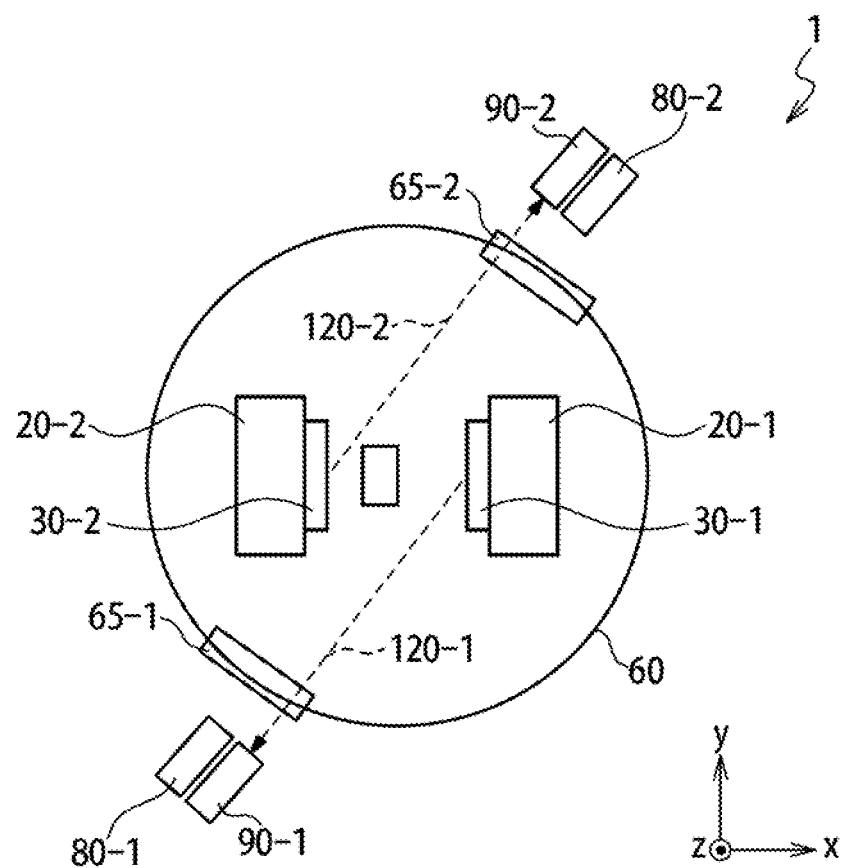
FIG. 4 is a schematic diagram of a solid state laser apparatus related to embodiment 2.

An example of a configuration for measuring temperature of the laser media 30 will be described. The laser media 30 emit light waves 120 (a first light wave 120-1, a second light wave 120-2, or the like) when excited, as shown in FIG. 4. Spectrum of the light waves 120, that is, fluorescent spectrum thereof, change based on temperature. For this reason, by analyzing spectrum of the light wave 120 emitted by the laser media 30, temperature of the laser media 30 can be measured. In particular, the solid state laser apparatus 1 is provided with temperature measuring devices 90 (a first temperature measuring device 90-1, a second temperature measuring device 90-2, or the like) outside the vacuum vessel 60. Other configuration is similar to the Embodiment 1.

The temperature measuring devices 90 receive the light waves 120 emitted by the laser media 30. For this reason, the temperature measuring devices 90 are installed so as to be able to receive the light waves 120 emitted by the laser media 30 through the excitation light windows 65. In other words, the temperature measuring devices 90 are installed in a vicinity of the light irradiation sections 80.

Figure 5:
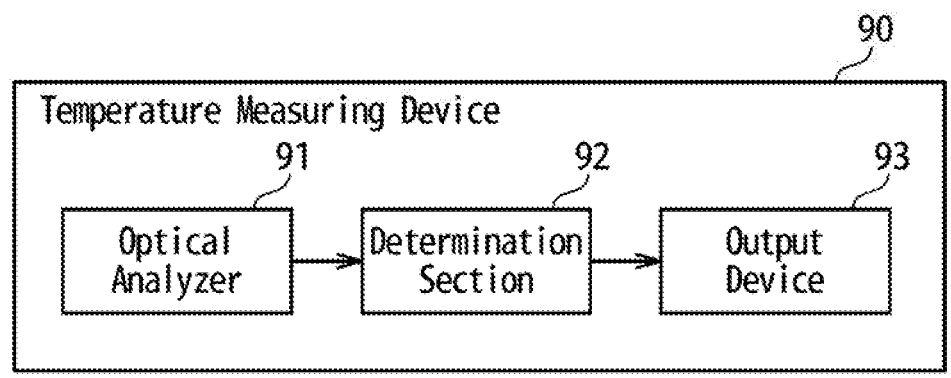
FIG. 5 is a diagram showing a configuration of a temperature measuring device in FIG. 4.

A temperature measuring device 90 is provided with an optical analyzer 91, a determination section 92 and an output device 93, as shown in FIG. 5. The optical analyzer 91 receives a light wave 120 emitted by a laser medium 30, analyzes spectrum of the light wave 120 and obtains fluorescent spectrum thereof. The optical analyzer 91 transmits detection signals including information showing the obtained fluorescent spectrum to the determination section 92. The optical analyzer 91 may be combined with optical devices for improving position resolution if necessary. For example, a convex lens may be provided in front of a light wave 120 receiving section and enlarge a region of desired position resolution in a desired magnification.

The determination section 92 receives the detection signal and extract fluorescent spectrum therefrom. The determination section 92 determines the temperature of the laser media 30 based on the extracted fluorescent spectrum. In particular, the determination section 92 holds the fluorescent spectrum corresponding to the temperature of the laser media 30 as temperature data. For this reason, in particular, the determination section 92 searches fluorescent spectrum closest to the extracted fluorescent spectrum from temperature data and extracts corresponding temperature. The determination section 92 determines the extracted temperature as the temperature of the laser media 30. The determination section 92 transmits a temperature signal including information showing the determined temperature to the output device 93. The determination section 92 includes a processing device such as a central processing unit (CPU) and a storage device such as a hard disk drive, for example.

The output device 93 receives the temperature signal and extracts the temperature of the laser media 30. The output device 93 displays the extracted temperature. For example, the output device 93 includes a display.

As described above, the solid state laser apparatus 1 can measure temperature of the laser media 30. For this reason, a user of the solid state laser apparatus 1 can verify temperature of the laser media 30 when increasing energy of excitation light outputted by the excitation light source 70, when increasing energy of laser beam outputted by the seed light source 40, or the like. When the user verifies the temperature of the laser media 30, the energy of excitation light and the energy of the laser beam can be adjusted so as not to exceed a predetermined temperature. In addition, cooling performance of the cooling apparatus 10 may be adjusted too. For this reason, the laser beam can be efficiently outputted by adjusting the excitation light energy, the laser beam energy and the cooling performance by the user.

Embodiment 3

Figure 6:
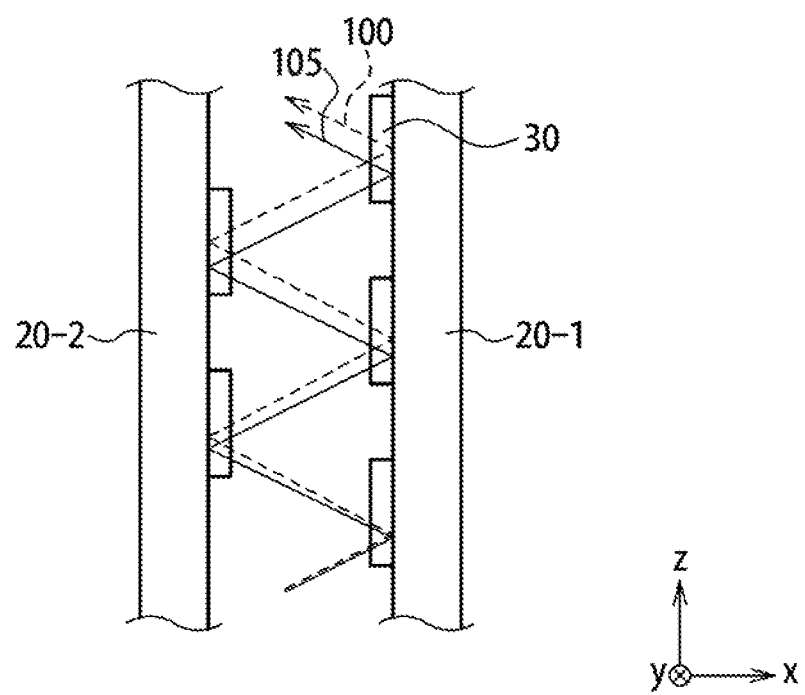
FIG. 6 is a diagram for explaining influence of manufacturing error and heat to change of refractive index.

The laser beam reflects on a plurality of laser media 30. For this reason, a light path of the laser beam may change from a laser beam path 100 at a time of design to an actual laser beam path 105, as shown in FIG. 6, due to manufacturing error, change of refractive index due to heat generated in laser media 30, or the like. As a result, a position of a laser medium 30 where the laser beam is irradiated is shifted from a position where the excitation light is irradiated. As a result, amplification efficiency of the laser beam by the laser media decreases.

Figure 7:
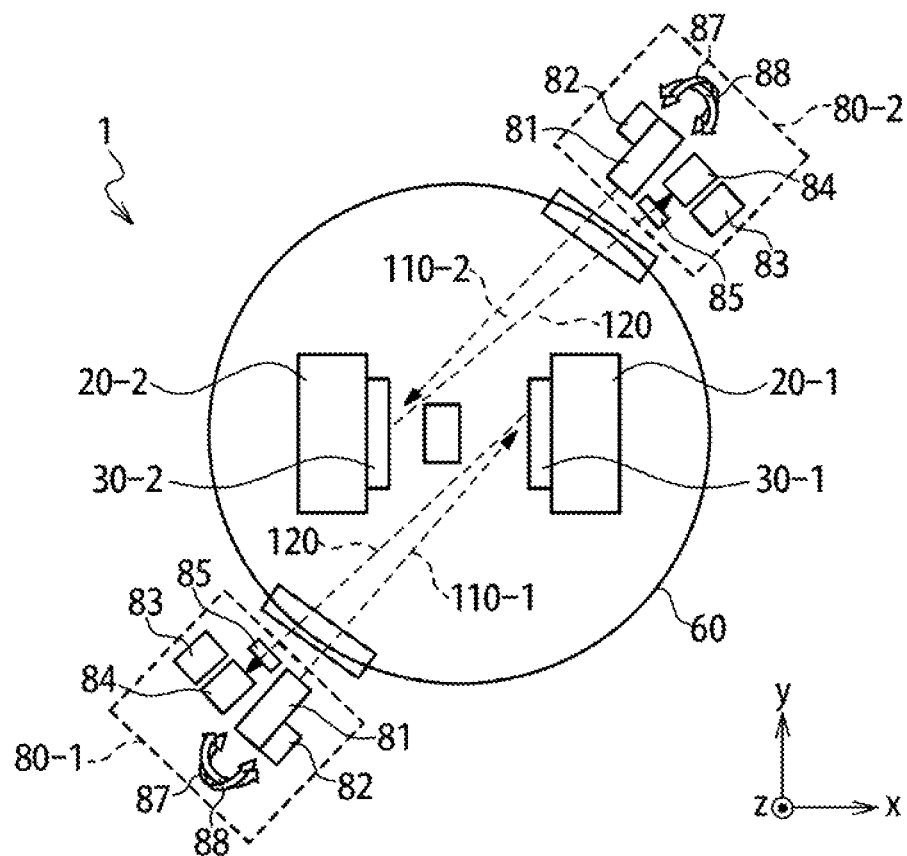
FIG. 7 is a schematic diagram of a solid state laser apparatus related to embodiment 3.

In the Embodiment 3, an example of keeping laser beam amplification efficiency by correcting position of irradiating excitation light on the laser media 30 will be shown. As shown in FIG. 7, a light irradiation section 80 is provided with an irradiation section 81, a driving section 82, an angle control section 83, an optical sensor 84 and a filter 85. Other configurations are similar to the Embodiment 1.

The irradiation section 81 is connected to the optical fiber 75. The irradiation section 81 irradiates the laser medium 30 with excitation light transmitted from the optical fiber 75. For this reason, the irradiation section 81 is provided with a lens and focuses the excitation light.

The driving section 82 supports the irradiation section 81 and rotates the irradiation section 81 in a first rotation direction 87 and a second rotation direction 88. A first rotation axis of the first rotation direction 87 and a second rotation axis of the second rotation direction 88 are orthogonal to each other. In addition, the first rotation axis and the second rotation axis are orthogonal to a straight line connecting the irradiation section 81 and the laser medium 30. The driving section 82 adjusts the direction in that the irradiation section 81 irradiates with the excitation light by rotating the irradiation section 81 in the first rotation direction 87 and the second rotation direction 88. The driving section 82 is provided with an actuator for example.

The optical sensor 84 detects light wave 120 received from a direction of the laser medium 30. The optical sensor 84 is installed in a vicinity of the irradiation section 81 in order to receive the light wave 120. The optical sensor 84 may be supported by the driving section 82, similarly to the irradiation section 81.

The filter 85 is provided in front of the optical sensor 84, that is, in a direction from the optical sensor 84 to the laser medium 30. The filter 85 transmits the light having a wavelength of the laser beam and blocks other light. For this reason, the light wave 120 that the optical sensor 84 receives is limited to light having a wavelength of the laser beam.

The angle control section 83 calculates a position of the laser medium 30 where the laser beam is irradiated, based on detection result of the optical sensor 84. In particular, since the optical sensor 84 receives light having a wavelength of the laser beam, the angle control section 83 calculates the position where the laser is irradiated based on the direction of the detected light. The angle control section 83 determines an irradiation direction to which the irradiation section 81 should irradiate with the excitation light based on the position where the laser beam is irradiated. In addition, the angle control section 83 calculates, based on the irradiation direction, an angle in the first rotation direction 87 and an angle in the second rotation direction 88 to rotate the irradiation section 81 and instructs the driving section 82. The angle control section 83 may be installed at an arbitrary position as long as communications can be performed with the optical sensor 84 and the driving section 82. The angle control section 83 may be installed in a vicinity of the driving section 82 for example.

Figure 8:
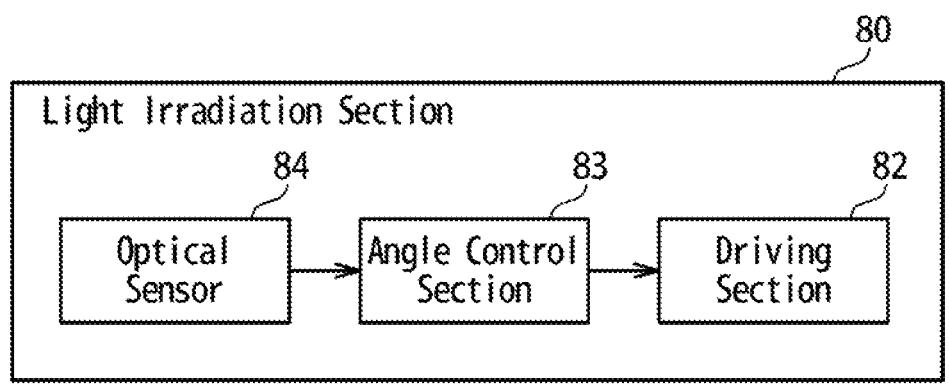
FIG. 8 is a diagram for explaining function of a light irradiation section in FIG. 7.

A method of the light irradiation section 80 to change irradiation direction of the excitation light will be described. As shown in FIG. 8, the optical sensor 84 generates a light wave signal including information of detected light wave 120 and transmits it to the angle control section 83.

The angle control section 83 receives the light wave signal and extracts information of the light wave 120 the optical sensor 84 received. The light wave 120 received by the optical sensor is limited to light having laser beam wavelength by the filter 85. For this reason, information showing the laser beam path 100 is included in information of light wave 120 that is extracted. Therefore, the angle control section 83 calculates from the light wave signal, based on information of laser beam path 100, a position of the incident surface 30c of the laser medium 30 on which the laser beam is irradiated. Next, the angle control section 83 determines a direction in which the irradiation section 81 should irradiate with the excitation light, based on the calculated position. Finally, the angle control section 83 calculates an angle the driving section 82 should rotate in the first rotation direction 87 and an angle the driving section 82 should rotate in the second rotation direction 88, based on the determined direction, and generates an angle signal including information showing the determined angles.

The driving section 82 receives the angle signal and extracts the angle in the first rotation direction 87 and the angle in the second rotation direction 88 to be rotated. The driving section 82 rotates the irradiation section 81 in the first rotation direction 87 and the second rotation direction 88 based on both of extracted angles. As a result, the direction in which the irradiation section 81 irradiates with the excitation light is changed so that the excitation light reaches the position of the laser medium 30 where the laser beam is incident.

Thus, even if a shift occurs from the laser beam path 100 at a time of design to the actual laser beam path 105 due to a manufacturing error or a thermal distortion, the excitation light can be irradiated at the position of the laser medium 30 where the laser beam is irradiated. As a result, the amplification efficiency of the laser beam can be suppressed from decreasing. In addition, by adjusting laser medium 30 angle, the laser beam path 100 can be adjusted. However, the angle of each laser medium 30 mutually affects the laser beam path 100 and cannot be independently adjusted. On the other hand, when adjusting the irradiation position with excitation light, angles of the plurality of irradiation sections 81 can be adjusted independently to each other. In addition, since the angles of the irradiation sections 81 can be adjusted even when the solid state laser apparatus 1 is in use, the amplification efficiency of the laser beam can be suppressed from decreasing even if the laser beam path 100 is changed due to thermal distortion occurred during the use. In particular, this is effective when it is difficult to adjust angles of the laser media 30, when the laser media 30 are in close contact with the cold heads 20, or the like.

Embodiment 4

Figure 9:
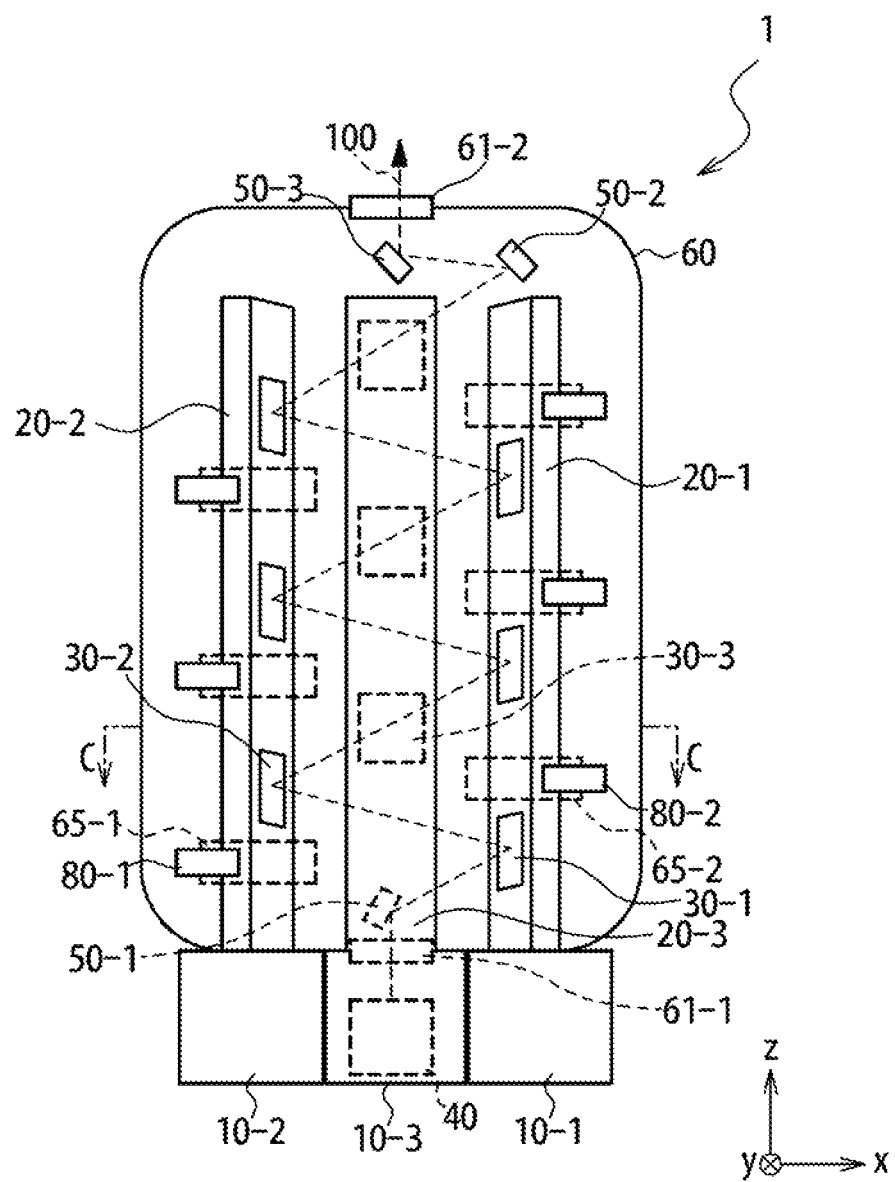
FIG. 9 is a schematic diagram of a solid state laser apparatus related to embodiment 4.

In the embodiment 4, as shown in FIG. 9, an example in that the solid state laser apparatus 1 is provided with three cold heads 20 (a first cold head 20-1, a second cold head 20-2, a third cold head 20-3) is shown. For this reason, the solid state laser apparatus 1 is provided with a first cooling apparatus 10-1 that cools the first cold head 20-1, a second cooling apparatus 10-2 that cools the second cold head 20-2 and a third cooling apparatus 10-3 that cools the third cold head 20-3. A component having a same function as the embodiment 1 will be referred with a same symbol.

In addition, here, functions and configurations that are different from those of the embodiment 1 will be described and description of functions and configurations same as those of the embodiment 1 will be omitted. In addition, similarly to the embodiment 1, the longitudinal direction of the cold heads 20 will be set to z axis direction. However, y axis direction will be set to a direction perpendicular to a side surface of the third cold head 20-3 with which the laser media 30 are in close contact, and x axis direction will be set to a direction perpendicular to y axis direction and z axis direction. A direction from the cold heads 20 to the cooling apparatuses 10 that are provided thereto is set to −z direction. It should be noted that for an easier understanding the excitation light source 70 and optical fibers 75 are omitted in FIG. 9.

Figure 10:
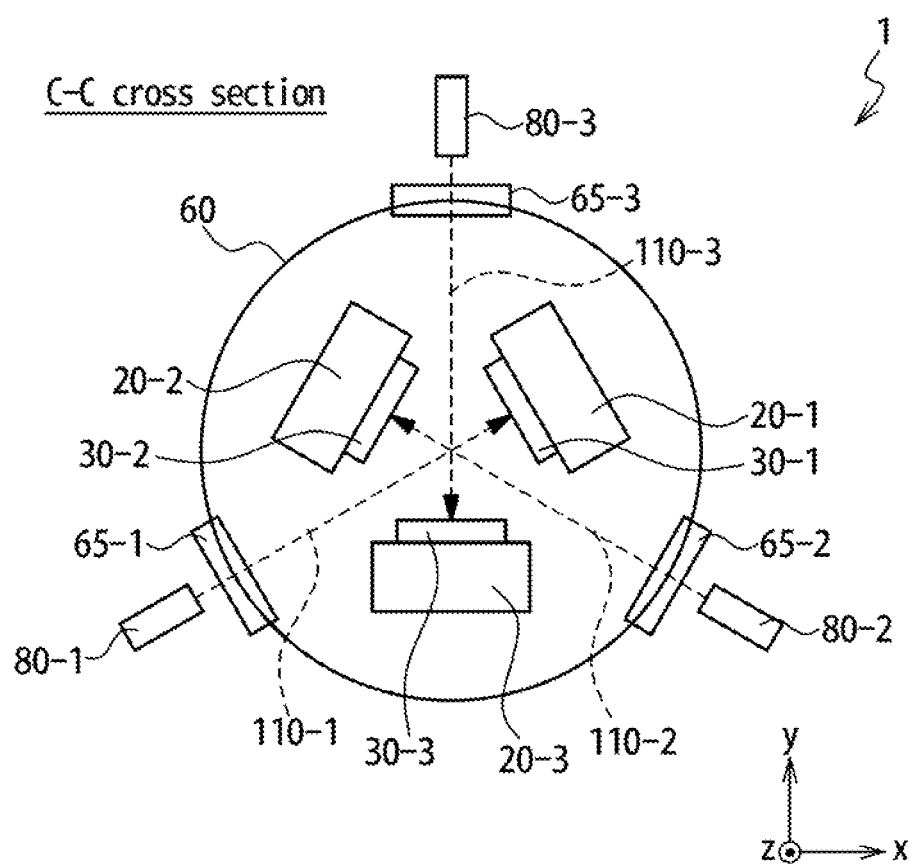
FIG. 10 is a C-C cross section diagram of FIG. 9.

As shown in FIG. 10, a side surface of the first cold head 20-1 on which laser media 30 are in close contact, a side surface of the second cold head 20-2 on which laser media 30 are in close contact and a side surface of the third cold head 20-3 on which laser media 30 are in close contact are facing a center of the vacuum vessel 60. In other words, laser media 30 are in close contact to a side surface among side surfaces of a cold heads 20 facing the center of the vacuum vessel 60. An angle between side surfaces of two cold heads 20 facing the center of the vacuum vessel 60 is 60 degrees for example.

In addition, as shown in FIG. 9, laser media 30 in close contact to the second cold head 20-2 are shifted in +z direction from laser media 30 in close contact to the first cold head 20-1. In addition, laser media 30 in close contact to the third cold head 20-3 are shifted in +z direction from laser media 30 in close contact to the second cold head 20-2. In other words, in z axis direction, a laser medium 30 of the second cold head 20-2 and a laser medium 30 of the third cold head 20-3 are provided between adjacent laser media 30 of the first cold head 20-1. In addition, in z axis direction, a laser medium 30 of the third cold head 20-3 and a laser medium 30 of the first cold head 20-1 are provided between adjacent laser media 30 of the second cold head 20-2. For example, in z axis direction, the second laser medium 30-2 may be arranged on a middle point between the first laser medium 30-1 and the third laser medium 30-3. In addition, the third laser medium 30-3 may be arranged on a middle point between the second laser medium 30-2 and the fourth laser medium 30-4. Here, the first laser medium 30-1 and the fourth laser medium 30-4 are provided adjacent to each other. For this reason, for example, the laser beam reflected by the first laser medium 30-1 in close contact to the first cold head 20-1 is incident to the second laser medium 30-2 in close contact to the second cold head 20-2. In addition, the laser beam reflected by the second laser medium 30-2 in close contact to the second cold head 20-2 is incident to the third laser medium 30-3 in close contact to the third cold head 20-3. Further, the laser beam reflected by the third laser medium 30-3 in close contact to the third cold head 20-3 is incident to the fourth laser medium 30-4 in close contact to the first cold head 20-1. As described above, the laser media 30 in close contact to the first cold head 20-1, the laser media 30 in close contact to the second cold head 20-2 and the laser media 30 in close contact to the third cold head 20-3 sequentially reflect the laser beam. That is, the laser beam reflected by the laser media 30 is sequentially reflected by each laser medium 30 and travels along the laser beam path 100, in a spiral and in +z direction.

A configuration of the solid state laser apparatus 1 will be described. The solid state laser apparatus 1 is provided with a cooling apparatus 10, cold heads 20, laser media 30, a seed light source 40, mirrors 50, a vacuum vessel 60, an excitation light source 70, optical fibers 75 and light irradiation sections 80, similarly to the embodiment 1. The cooling apparatus 10 is divided in three that cool three cold heads 20, respectively.

The cold heads 20 are installed so that the laser media 30 installed to each of the first cold head 20-1, the second cold head 20-2 and the third cold head 20-3 sequentially reflect a laser beam. In particular, the laser beam reflected by a laser medium 30 installed to the first cold head 20-1 is reflected to a laser medium 30 installed to the second cold head 20-2, is further reflected to a laser medium 30 installed to the third cold head 20-3 and is reflected to a laser medium 30 installed to the first cold head 20-1.

The light irradiation sections 80 are installed so as to irradiate laser medium 30 with excitation light. The light irradiation sections 80 are installed in a direction perpendicular to incident surfaces 30c of laser media 30.

Excitation light windows 65 of the vacuum vessel 60 are provided at positions where the excitation light paths 110 cross the vacuum vessel 60. In particular, the excitation light windows 65 are provided in directions perpendicular to incident surfaces 30c of laser media 30.

As described above, the solid state laser apparatus 1 may be provided with three cold heads 20. In addition, four or more cold heads 20 may be provided. For example, the solid state laser apparatus 1 may be provided with a plurality of cold heads 20 arranged on a circumference. In this case, when two cold heads 20 adjacent to each other, that are a first cold head 20-1 and a second cold head 20-2, a laser medium 30 of the first cold head 20-1 may reflect a laser beam to a laser medium 30 of the second cold head 20-2. That is, the laser beam may be sequentially reflected by laser media 30 in stalled to cold heads 20 and travel in spiral and in +z direction.

In addition, when the laser beam is sequentially reflected by laser media 30 installed to the cold heads 20 and travels in +z direction, an arbitrary laser beam path 100 may be selected. For example, the solid state laser apparatus 1 may be provided with five cold heads 20 arranged on a circumference. In this case, the laser beam path 100 may be of a five-pointed star shape when viewed from +z direction. That is, a laser medium 30 may reflect the laser beam to a laser medium 30 installed to a cold head 20 facing a cold head 20 to which the relevant laser medium 30 is installed.

Embodiment 5

Figure 11:
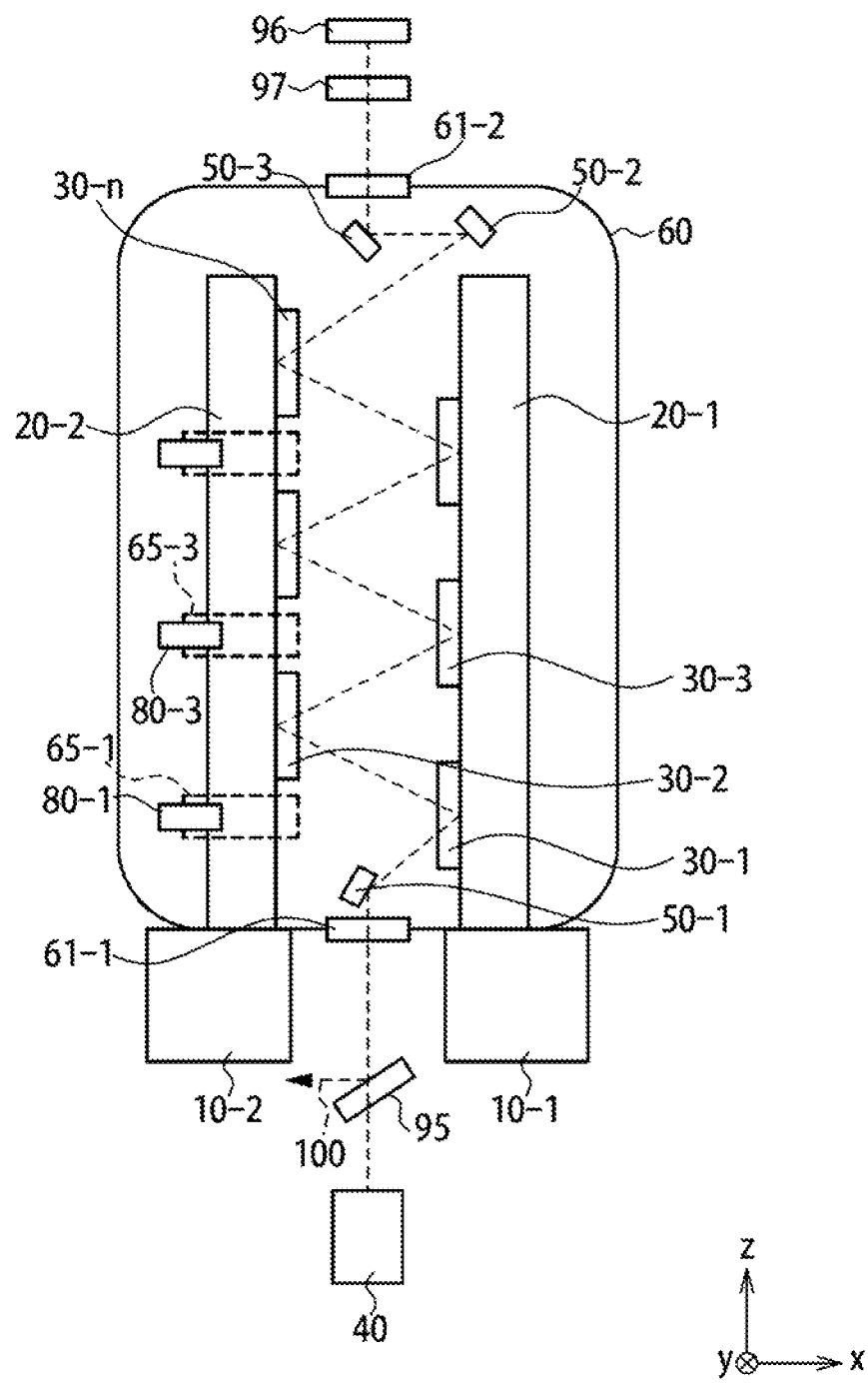
FIG. 11 is a schematic diagram of a solid state laser apparatus related to embodiment 5.
Figure 12:
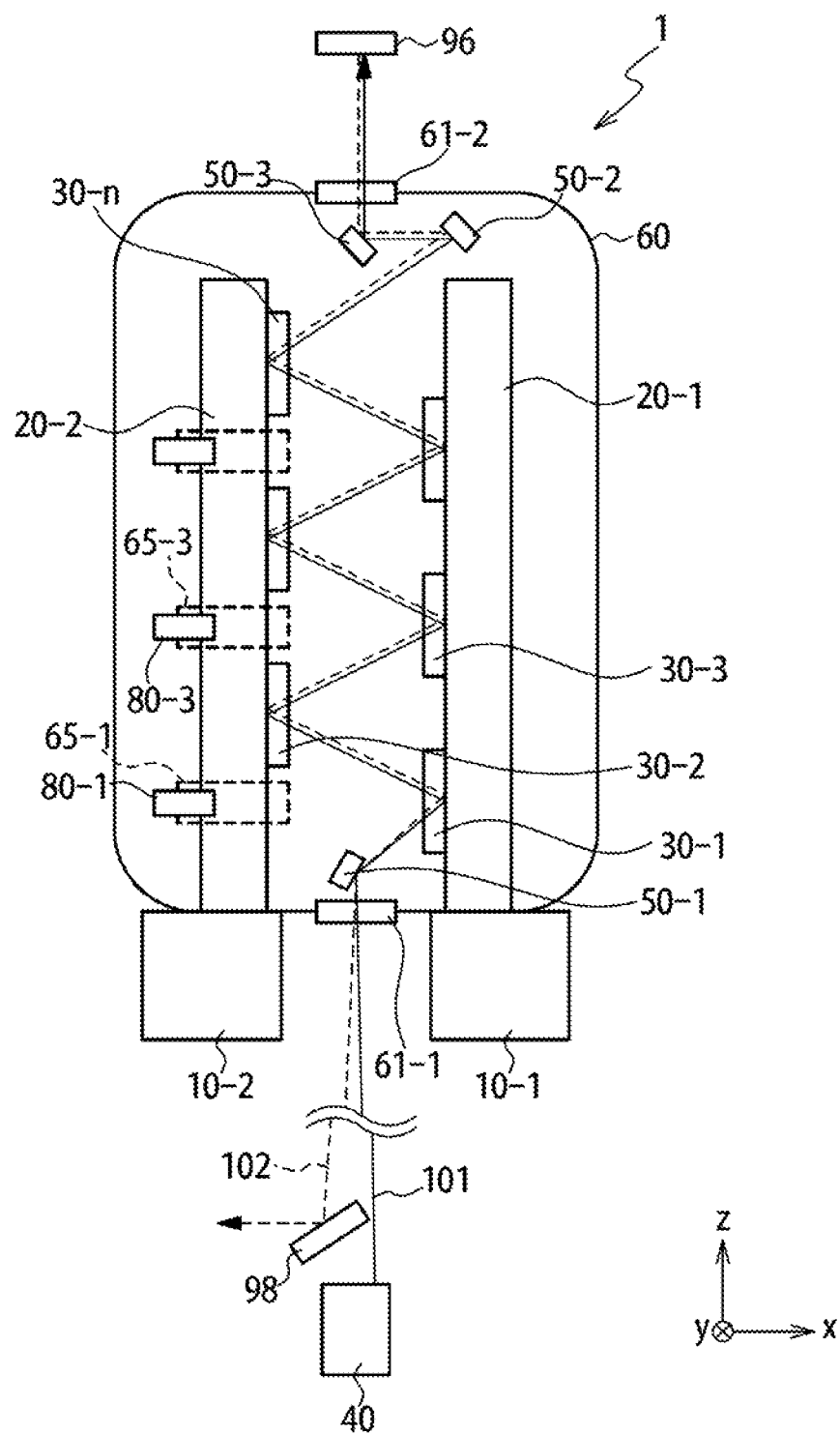
FIG. 12 is a schematic diagram of a solid state laser apparatus related to a variation example of embodiment 5.

In the embodiment 5, an example in that the laser beam is reflected a plurality of times by a same laser medium 30 by turning the laser beam path 100 will be shown. The solid state laser apparatus 1 is provided with a turning mirror 96 that reflects the laser beam outputted by the second laser window 61-2 of the vacuum vessel 60 in order to turn the laser beam, as shown in FIG. 11. In addition, the solid state laser apparatus 1 is provide with a wave plate 97 that changes a phase of the turned laser beam and a polarizer 95 that reflects the laser beam of which the phase is changed. Other configurations are similar to the embodiment 1.

The turning mirror 96 is provided outside the vacuum vessel 60 and reflects the laser beam. A surface of the turning mirror 96 that reflects the laser beam is perpendicular to the laser beam path 100 of the laser beam outputted by the vacuum vessel 60. For this reason, the laser beam reflected by the turning mirror 96 travels along the laser beam path 100.

The wave plate 97 is provided between the turning mirror 96 and the second laser window 61-2 of the vacuum vessel 60. The wave plate 97 can change a polarization state of the laser beam by providing a phase difference between two polarization components perpendicular to each other of the laser beam passing thereby. In particular, a quarter wave plate, that shifts the phase difference of an angle corresponding to a quarter wavelength of the laser beam, is used. The laser beam outputted by the vacuum vessel 60 passes twice through the wave plate 97, when it is incident to the turning mirror 96 and when reflected by the turning mirror 96. For this reason, the phase of the laser beam incident from the second laser window 61-2 to inside the vacuum vessel 60 is shifted of an angle corresponding to a half wavelength of the laser beam. By making a laser beam of a linear polarization inclined by 45 degrees with respect to an optical axis of the wave plate 97, the polarization direction can be changed by 90 degrees (for example, from p-polarization to s-polarization).

The polarizer 95 is provided between the first laser window 61-1 and the seed light source and separates the laser beam. The polarization state of the laser beam reflected by the turning mirror 96 is changed by the wave plate 97, with respect to the laser beam irradiated by the seed light source 40, from p-polarization to s-polarization for example. For this reason, the polarizer 95 can make the laser beam irradiated from the seed light source 40 pass and reflect the laser beam reflected by the turning mirror 96. The solid state apparatus 1 outputs the laser beam reflected by the polarizer 95.

As described above, the solid state laser apparatus 1 can increase energy of the outputted laser beam, by use of the polarizer 95, the turning mirror 96 and the wave plate 97 and by reflecting the laser beam a plurality of times by the same laser media 30.

In addition, the method of increasing energy of outputted laser beam by turning the laser beam is not limited to the above and can be arbitrarily selected. For example, the solid state laser apparatus 1 may be provided with turning mirror 96 that reflects the laser beam and a separating mirror 98 that separates the laser beam outputted from the first laser window 61-1. In this case, the laser beam emitted by the seed light source 40 travels along a first half laser beam path 101 and is outputted by the second laser window 61-2. The turning mirror 96 reflects the laser beam outputted from the second laser window 61-2. Here, the surface of the turning mirror 96 that reflects the laser beam is not perpendicular to the first half laser beam path 101. For this reason, the laser beam reflected by the turning mirror 96 does not pass by the first half laser beam path 101 and passes along a second half laser beam path 102. Thus, the laser beam outputted from the first laser window 61-1 does not match with the first half laser beam path 101. As a result, the separation mirror 98 can reflect the laser beam outputted from the first laser window 61-1. The solid state laser apparatus 1 outputs the laser beam reflected by the separation mirror 98.

Embodiment 6

Figure 13:
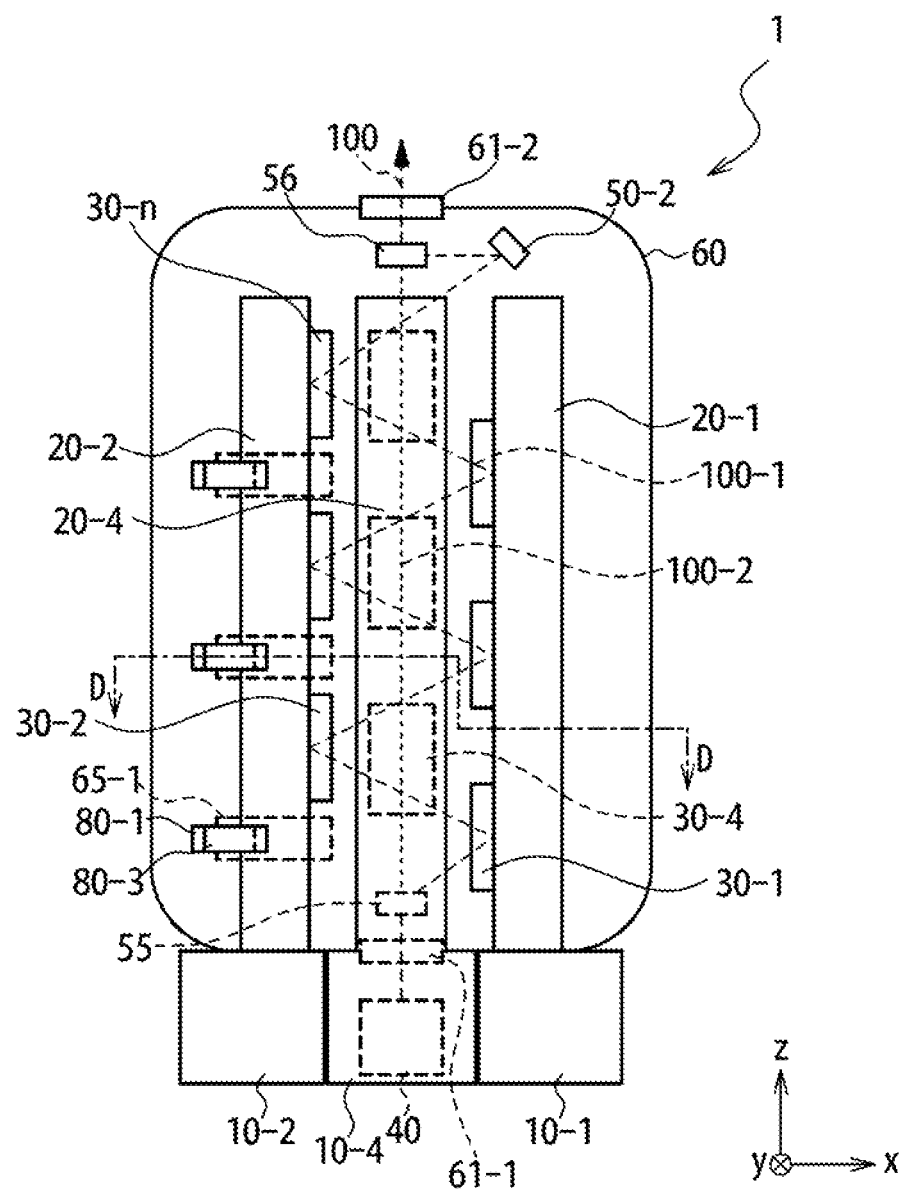
FIG. 13 is a schematic diagram of a solid state laser apparatus related to embodiment 6.
Figure 14:
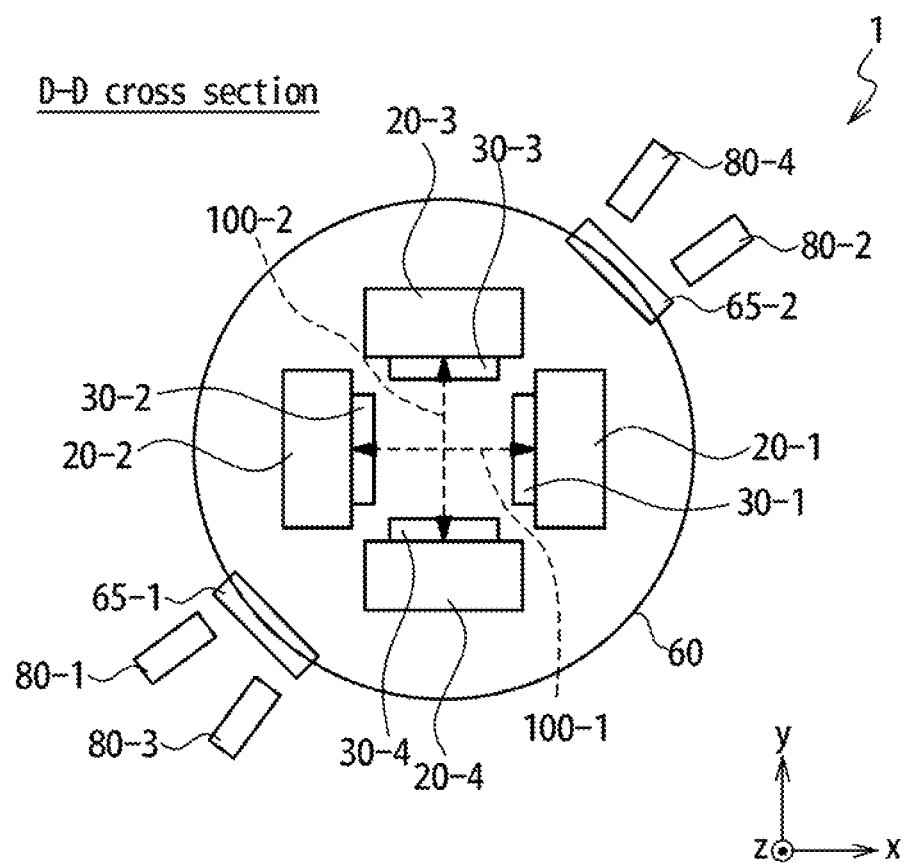
FIG. 14 is a D-D cross section diagram of FIG. 13.

In the embodiment 6, the solid state laser apparatus 1 splits the laser beam irradiated by the seed light source 40. An example of amplifying split laser beams in each laser beam path 100 and combining amplified laser beams will be described. The solid state laser apparatus 1 is provided with four cold heads 20 (a first cold head 20-1, a second cold head 20-2, a third cold head 20-3, a fourth cold head 20-4) and cooling apparatuses 10 (a first cooling apparatus 10-1, a second cooling apparatus 10-2, a third cooling apparatus 10-3 which is not shown, a fourth cooling apparatus 10-4) that cool each cold head 20, as shown in FIGS. 13 and 14. A component having a same function as the embodiment 1 will be referred with a same symbol. In addition, here, functions and configurations that are different from those of the embodiment 1 will be described and description of functions and configurations same as those of the embodiment 1 will be omitted. In addition, similarly to the embodiment 1, the longitudinal direction of the cold heads 20 will be set to z axis direction. However, x axis direction will be set to a direction perpendicular to a side surface of the second cold head 20-2 with which the laser media 30 are in close contact, and y axis direction will be set to a direction perpendicular to z axis direction and x axis direction. A direction from the cold heads 20 to the cooling apparatuses 10 that are provided thereto is set to −z direction.

The cold heads 20 are arranged, as shown in FIG. 14, so that a surface of the first cold head 20-1 to which laser media 30 are in close contact thereto and a surface of the second cold head 20-2 to which laser media 30 are in close contact thereto are facing to each other in parallel. In addition, a surface of the third cold head 20-3 to which laser media 30 are in close contact thereto and a surface of the fourth cold head 20-4 to which laser media 30 are in close contact thereto are facing to each other in parallel.

In addition, the solid state laser apparatus 1 is provided with an optical splitter 55 and an optical combiner 56, as shown in FIG. 13. The optical splitter 55 is provided inside the vacuum vessel 60 and is supported by the vacuum vessel 60. The optical splitter 55 receives the laser beam irradiated by the seed light source 40 and split it to two laser beams. A first laser beam that is one of the split laser beams is irradiated to the first laser medium 30-1 installed to the first cold head 20-1. A second laser beam that is another one is irradiated to the third laser medium 30-3 installed to the third cold head 20-3.

The first laser beam irradiated to the first laser medium 30-1 is reflected by the first laser medium 30-1 and irradiated to the second laser medium 30-2 installed to the second cold head 20-2. The second laser medium 30-2 reflects the irradiated first laser beam to the laser medium 30 installed to the first cold head 20-1. As described above, the first laser beam is reflected by the laser media 30 installed to the first cold head 20-1 and the laser media 30 installed to the second cold head 20-2, travels along the first laser beam path 100-1 and is irradiated to the optical combiner 56. That is, when the laser media 30 installed to the first cold head 20-1 and the laser media 30 installed to the second cold head 20-2 are called as a first laser media group, the first laser beam is sequentially reflected by laser media 30 included in the first laser media group. As a result, the first laser beam is amplified by laser media 30 of the first laser media group.

The second laser beam irradiated to the third laser media 30-3 is reflected by the third laser media 30-3 and is irradiated to the fourth laser media 30-4 installed to the fourth cold head 20-4. The fourth laser media 30-4 reflects the irradiated second laser beam to a laser medium 30 installed to the third cold head 20-3. As described above, the second laser beam is reflected by the laser media 30 installed to the third cold head 20-3 and the laser media 30 installed to the fourth cold head 20-4, travels along a second laser beam path 100-2 and is irradiated to the optical combiner 56. That is, when the laser media 30 installed to the third cold head 20-3 and the laser media 30 installed to the fourth cold head 20-4 are called as a second laser media group, the second laser beam is sequentially reflected by the laser media 30 included in the second laser media group. As a result, the second laser beam is amplified by the laser media 30 of the second laser media group.

The optical combiner 56 is provided inside the vacuum vessel 60 and is supported by the vacuum vessel 60. The optical combiner 56 combines the amplified first laser beam and the amplified second laser beam. The solid state laser apparatus 1 outputs the combined laser beam from the second laser window 61-2.

As a result, since the laser beam irradiated by the seed light source 40 is split to the first laser beam and the second laser beam, energy of the first laser beam and the second laser beam irradiated to the laser media 30 is smaller than the energy of the laser beam before splitting. For this reason, heat generated inside the laser media 30 can be suppressed.

In the embodiment 6, although an example of setting sets of two cold heads 20 and providing a first laser beam path 100-1 and a second laser beam path 100-2 is shown, the solid state laser apparatus 1 is not limited to this. A number of cold heads 20 in a set can be arbitrarily selected. For example, a set of cold heads 20 may include three cold heads 20. In this case, a laser beam path 100 is provided by laser media 30 installed to three cold heads 20.

In addition, although an example of providing two sets of cold heads 20 and providing two laser beam paths 100 (the first laser beam path 100-1, the second laser beam path 100-2) is shown, the solid state laser apparatus 1 is not limited to this. The number of sets of cold heads 20 included in the solid state laser apparatus 1 can arbitrarily selected. For example, the solid state laser apparatus 1 may be provided with three sets of cold heads 20. In this case, the optical splitter 55 splits the laser beam irradiated by the seed light source 40 to three laser beams. The laser media 30 installed to each set of cold heads 20 amplify the split laser beams. The optical combiner 56 combines the amplified laser beams.

(Variation Examples)

Although in the above described embodiments examples in which the plurality of cold heads 20 are respectively cooled by different cooling apparatuses 10 are shown, the embodiments are not limited to these. For example, a single cooling apparatus 10 may cool a plurality of cold heads, all cold heads 20 for example. In addition, a plurality of cooling apparatuses 10 may cool a single cold head 20.

In addition, although an example in which a cooling apparatus 10 cools connection part with a cold head 20 by compressing and expanding refrigerant, the embodiments are not limited by this. As long as the connection parts with the cold heads 20 can be cooled, arbitrary method may be selected.

Although in the above described embodiments an example in which the vacuum vessel 60 is provided with a hole for the cooling apparatus 10 to cool the cold heads 20, the embodiments are not limited to this. As long as the cooling apparatuses 10 can cool the cold heads 20, arbitrary method may be selected. For example, the vacuum vessel 60 may be provided with a heat conduction section formed with a material of a high thermal conductivity such as copper for example. In this case, the cooling apparatuses cool the cold heads 20 via heat conduction section.

Figure 15:
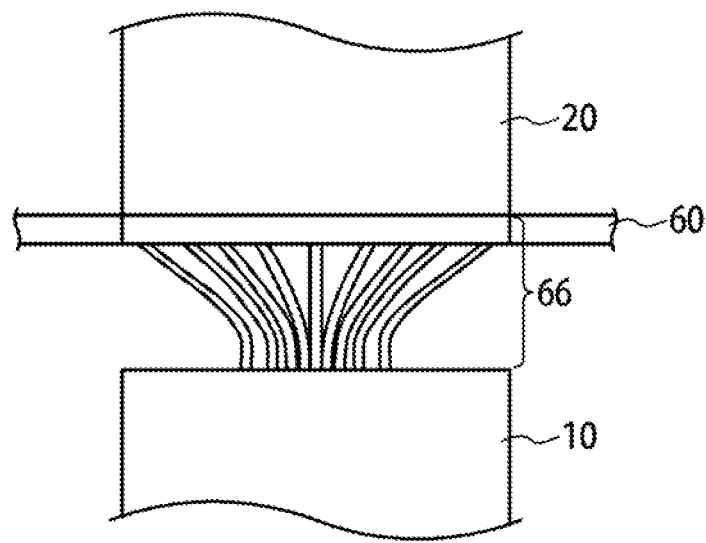
FIG. 15 is a schematic diagram related to a variation example of connection part between a cooling apparatus and a cold head.

In addition, when the cooling apparatuses 10 cool the cold heads 20 via the heat conduction section, vibrations transmitted from the cooling apparatuses 10 to the cold heads 20 may be suppressed by the heat conduction section. For example, the heat conduction section may be formed with soft materials of a high thermal conductivity, such as high purity aluminum or copper and suppress vibrations. In addition, the heat conduction section may be provided with a heat conduction structure 66 formed by building a plurality of plates, wires or the like, as shown in FIG. 15.

Figure 16:
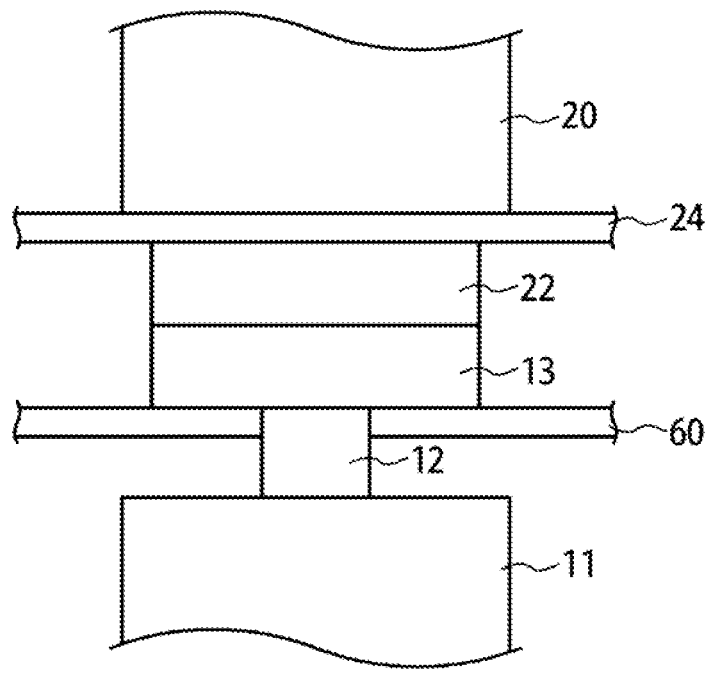
FIG. 16 is a schematic diagram related to a variation example of connection part between a cooling apparatus and a cold head.

In addition, a cooling apparatus 10 cools refrigerant by a compressor 11 and provides the refrigerant to a cold section 13 via a refrigerant pipe 12. The cool section 13 may be provided inside the vacuum vessel 60, as shown in FIG. 16. In this case, the compressor 11 is installed outside the vacuum vessel 60. For this reason, the refrigerant pipe 12 penetrates through the hole of the vacuum vessel 60 and connects the compressor 11 and the cool section 13. In addition, the refrigerant pipe 12 is formed with a Bellows tube or the like and suppresses vibrations generated in the compressor to be transmitted to the cool section 13.

In addition, a vibration suppressing section 22 may be provided between the cool section 13 and the cold heads 20. In this case, the vibration suppressing section 22 suppress vibration transmitted from the cooling apparatuses 10 to the cold heads 20. The vibration suppressing section 22 is formed with soft materials of high heat conductivity, such as high purity aluminum, copper or the like. In addition, the vibration suppressing section 22 may be formed by building a plurality of plates, wires or the like.

Furthermore, a support stand 24 may be provided between the vibration suppressing section 22 and the cold heads 20. In this case, the support stand 24 supports the cold heads 20. In addition, although an example in which the mirrors 50 inside the vacuum vessel 60 are supported by the vacuum vessel 60 is shown, the embodiments are not limited to this and the mirrors 50 may be supported by the support stand 24.

In addition, although an example of the cooling apparatuses 10 cool connection part with cold heads 20 is shown, the embodiments are not limited to this. As long as the cooling apparatuses 10 can cool the cold heads 20, arbitrary method may be selected. For example, the cooling apparatuses 10 may provide refrigerant inside the cold heads 20 and cool.

In addition, the laser media 30 may be fit into recess provided to the cold heads 20. For example, an incident surface 30*c* of a laser medium 30 may be formed with a surface same as a side surface of a cold head 20. That is, in x axis direction, a position of the incident surface 30*c* may be same as a position of the side surface of the cold head 20.

In addition, light absorber may be provided around the laser media 30. Light absorber includes a dope materials added with Cr (Chromium), a dope material added with Sm (Samarium), or the like.

In addition, although an example in which a reflection surface 30*a* is formed at a back surface of a contact surface 30*b*, that is, inside a laser medium 30, is shown, the embodiments are not limited to this. For example, the reflection surface 30*a* may be provided at a boundary between the laser medium 30 and the cold head 20. That is, the reflective surface 30*a* may be provided on the back surface of the contact surface 30*b* or on a surface of the cold head 20. In addition, the reflection surface 30*a* may be provided between the incident surface 30*c* and the contact surface 30*b*. Here, a wording of reflecting by a laser medium 30 includes a case of reflecting on a surface of a cold head 20.

Although in the above described embodiments, an example in which a temperature measuring device 90 is provided with an optical analyzer 91 is shown, the embodiments are not limited to this. As long as temperature of the laser media 30 can be detected, arbitrary method may be selected. For example, a cryogenic thermocouple may be installed between laser media 30 and cold heads 20.

Although in the above described embodiments an example in which a light irradiation section 80 is provided outside the vacuum vessel 60 is shown, the embodiments are not limited to this. As long as the light irradiation section 80 can irradiate laser media 30 with excitation light, the light irradiation section 80 may be installed at an arbitrary position. For example, the light irradiation section 80 may be installed inside the vacuum vessel 60, and for example supported by the cold heads 20.

In addition, the light irradiation 80 may irradiate the laser media 30 with the excitation light via a penetration hole provided to the cold heads 20. In particular, this is effective in a case in which a cold head 20 is provided and no laser medium 30 is arranged in a direction perpendicular to a laser medium 30. In addition, although an example of providing a penetration hole to a cold head 20 is shown, as long as excitation light can be transmitted through the cold head 20, an arbitrary method may be selected. For example, a window through which excitation light can be transmitted may be provided to the cold head 20.

Although in the above described embodiments an example of providing an optical sensor 84 and a filter 85 in order to detect a position of a laser medium 30 irradiated with a laser beam is shown, the embodiments are not limited to this. For example, an optical analyzer 91 provided with a temperature measuring device 90 may be used. For example, a position where light intensity of a wavelength of a laser beam is more than or equal to a threshold value is detected by use of the optical analyzer 91. The angle control section 83 may determine the detected position as the position irradiated with the laser beam. This threshold value may be determined based on materials of laser media 30, for example fluorescent spectrum of the laser media 30.

In addition, the angle control section 83 may determine an irradiation direction of excitation light based on outputted energy of the irradiated laser beam, outputted energy of the irradiated excitation light, irradiation time of the laser beam and irradiation time of excitation light. That is, the irradiation direction of excitation light may be determined based on light irradiation state. In this case, the angle control section 83 hold in advance change information showing a position of the laser media 30 where the laser beam is irradiated corresponding to light irradiation state. The angle control section 83 acquires output energy and irradiation time of the laser beam and output energy and irradiation time of the excitation light. That is, the angle control section 83 acquires a current light irradiation state. The angle control section 83 searches the light irradiation state acquired from change information and extracts the position of the laser media 30 where the laser beam is irradiated. The irradiation direction of excitation light is determined based on the extracted position. In addition, the light irradiation state may be a part of the output energy of the laser beam, the output energy of the excitation light, the irradiation time of the laser beam and the irradiation time of the excitation light. It should be noted that change information is acquired by experiment or simulation.

Although in the above described embodiments an example in which the output device 93 of the temperature measuring device 90 displays temperature of laser media 30 is shown, the embodiments are not limited to this. For example, the cooling apparatus 10 may receive temperature signal including temperature of the laser media 30 and adjust cooling performance based on the temperature of the laser media 30. In addition, the seed light source 40 may receive the temperature signal and adjust the energy of the laser beam based on the temperature of the laser media 30.

It is clear that the present invention is not limited by the above described embodiments and that each embodiment may be appropriately modified or changed. Technologies of each embodiment can be used in another embodiment as long as no technical contradiction occurs. In other words, an above described process is an example and an order and a processing content of each step may be changed within a scope of not inhibiting functions. In addition, a described configuration can be arbitrarily changed within a scope of not inhibiting functions. For example, the solid state laser apparatus 1 may be provided with a light irradiation section 80 that controls an irradiation direction of excitation light and a temperature measuring device 90. Furthermore, more than three cold heads 20 may be provided thereto. In addition, a first set of cold heads 20 including more than three cold heads 20 and a second set of cold heads 20 including more than three cold heads 20 may be provided thereto. In this case, a first laser beam path 100-1 may be configured by laser media 30 installed to the cold heads 20 of the first set and a second laser beam path 100-2 may be configured by laser media 30 installed to the cold heads 20 of the second set.

The invention claimed is:

1. A solid state laser apparatus comprising:
   a plurality of cold heads including at least three cold heads;
   a cooling apparatus coupled with the plurality of cold heads and configured to cool the plurality of cold heads;
   a plurality of laser media arranged in contact with each of the plurality of cold heads and configured to amplify a first laser beam and reflect the first laser beam; and
   a seed light source configured to irradiate a first laser medium of the plurality of laser media with the first laser beam,
   wherein:
   the plurality of laser media are configured to reflect the first laser beam from the first laser medium which is arranged directly on a first cold head of the plurality of cold heads to a second laser medium of the plurality of laser media which is arranged directly on a second cold head of the plurality of cold heads;
   the plurality of cold heads are configured to cool the plurality of laser media;
   each of the plurality of laser media has a first surface in direct contact with a corresponding cold head of the plurality of cold heads and a second surface opposite to the first surface;
   the solid state laser apparatus is configured such that the first laser beam is: (i) incident on the first laser medium through the first surface of the first laser medium; (ii) reflected by the second surface of the first laser medium; and (iii) irradiated from the first surface of the first laser medium; and
   the solid state laser apparatus is configured such that the first laser beam is amplified by traveling through an inside of the first laser medium.

2. The solid state laser apparatus according to claim 1, wherein a thickness of the plurality of laser media is less than or equal to 1 mm.

3. The solid state laser apparatus according to claim 1, further comprising a vacuum vessel including the plurality of cold heads therein.

4. The solid state laser apparatus according to claim 1, further comprising a temperature measuring device configured to measure a temperature of at least one of the plurality of laser media.

5. The solid state laser apparatus according to claim 4, wherein the temperature measuring device comprises:
   an optical analyzer configured to analyze a spectrum of light released from each of the plurality of laser media; and
   a determination section configured to determine the temperature of each of the plurality of laser media based on the spectrum of light released therefrom.

6. The solid state laser apparatus according to claim 1, further comprising a light irradiation section supported by one of the plurality of cold heads and configured to irradiate each of the plurality of laser media with excitation light.

7. The solid state laser apparatus according to claim 1, further comprising a light irradiation section configured to irradiate each of the plurality of laser media with excitation light,
wherein the light irradiation section comprises:
an optical sensor configured to detect a light wave from the each of the plurality of laser media;
an angle control section configured to determine an irradiation direction of the excitation light based on a detection result; and
an irradiation section configured to irradiate a surface of each of the plurality of laser media where the first laser beam is irradiated, with the excitation light, based on the irradiation direction.

8. The solid state laser apparatus according to claim 7, wherein the angle control section is configured to:
calculate a position where the first laser beam is incident on each of the plurality of laser media based on the detection result; and
determine the irradiation direction so that the excitation light is irradiated at a point where the first laser beam is irradiated.

9. The solid state laser apparatus according to claim 7, wherein the light irradiation section comprises a filter configured to pass light of a wavelength of the first laser beam in front of the optical sensor.

10. The solid state laser apparatus according to claim 7, further comprising a vacuum vessel including the plurality of cold heads therein,
wherein:
the vacuum vessel comprises an excitation light window configured to transmit the excitation light; and
the light irradiation section is outside the vacuum vessel.

11. The solid state laser apparatus according to claim 1, further comprising a light irradiation section configured to irradiate each of the plurality of laser media with excitation light,
wherein the light irradiation section comprises:
an angle control section configured to determine an irradiation direction of the excitation light based on a light irradiation state; and
an irradiation section configured to irradiate a surface of each of the plurality of laser media where the first laser beam is irradiated, with the excitation light, based on the irradiation direction.

12. The solid state laser apparatus according to claim 11, wherein the angle control section is further configured to:
hold change information that shows a position of the laser medium where the first laser beam in correspondence with the light irradiation state is irradiated; and
determine the irradiation direction of the excitation light based on the position of the laser medium where the first laser beam in correspondence with a current light irradiation state is irradiated, from the change information.

13. A solid state laser apparatus comprising:
a plurality of cold heads;
a cooling apparatus coupled with the plurality of cold heads and configured to cool the plurality of cold heads;
a plurality of laser media arranged in contact with each of the plurality of cold heads and configured to amplify a first laser beam and reflect the first laser beam; and
a seed light source configured to irradiate a first laser medium of the plurality of laser media with the first laser beam,
wherein:
the plurality of cold heads are configured to cool the plurality of laser media;
each of the plurality of laser media has a first surface in direct contact with a corresponding cold head of the plurality of cold heads and a second surface opposite to the first surface;
the solid state laser apparatus is configured such that the first laser beam is: (i) incident on the first laser medium through the first surface of the first laser medium; (ii) reflected by the second surface of the first laser medium; and (iii) irradiated from the first surface of the first laser medium; and
the solid state laser apparatus is configured such that the first laser beam is amplified by traveling through an inside of the first laser medium,
wherein the plurality of cold heads include:
a first set of cold heads including two or more cold heads; and
a second set of cold heads including two or more cold heads,
wherein the plurality of laser media include:
a first laser media group including a laser medium arranged to the first set of cold heads; and
a second laser media group including a laser medium arranged to the second set of cold heads, and
wherein:
the first laser media group includes the first laser medium,
the seed light source is further configured to irradiate a second laser medium included in the second laser media group with a second laser beam;
one laser medium, which is included in the first laser media group and arranged directly on one cold head of the first set of cold heads, is configured to reflect the first laser beam incident to the first laser medium to another laser medium, which is included in the first laser media group and arranged directly on another cold head of the first set of cold heads different from the one cold head of the first set of cold heads; and
one laser medium, which is included in the second laser media group and arranged directly on one cold head of the second set of cold heads, is configured to reflect the second laser beam incident to the second laser medium to another laser medium, which is included in the second laser media group and arranged directly on another cold head of the second set of cold heads different from the one cold head of the second set of cold heads.

14. The solid state laser apparatus according to claim 13, further comprising a light combiner configured to combine the first laser beam reflected to the first laser media group and the second laser beam reflected to the second laser media group.

15. The solid state laser apparatus according to claim 13, wherein each of the plurality of laser media is configured to reflect the first laser beam from the first laser medium which is arranged directly on a first cold head of the plurality of cold heads to a third laser medium of the plurality of laser media which is arranged directly on a second cold head of the plurality of cold heads.

16. The solid state laser apparatus according to claim 1, wherein the solid state laser apparatus is configured such that the first laser beam travels along a laser beam path from the first laser medium to a fourth laser medium of the plurality of laser media which is arranged directly on the first cold head through the second laser medium and a third laser medium of the plurality of laser media which is arranged directly on a third cold head of the plurality of cold heads.

* * * * *